(12) United States Patent
Dire et al.

(10) Patent No.: US 10,676,542 B2
(45) Date of Patent: Jun. 9, 2020

(54) DIENE ELASTOMER HAVING A FUNCTION IN THE MIDDLE OF THE CHAIN AND RUBBER COMPOSITION CONTAINING THE SAME

(71) Applicant: COMPAGNIE GENERALE DES ETABLISSEMENTS MICHELIN, Clermont-Ferrand (FR)

(72) Inventors: Charlotte Dire, Clermont-Ferrand (FR); Florent Vaultier, Clermont-Ferrand (FR); Gaël Courbes, Clermont-Ferrand (FR); Benoit De-Gaudemaris, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 12 days.

(21) Appl. No.: 15/765,603

(22) PCT Filed: Oct. 7, 2016

(86) PCT No.: PCT/EP2016/073949
§ 371 (c)(1),
(2) Date: Apr. 3, 2018

(87) PCT Pub. No.: WO2017/060395
PCT Pub. Date: Apr. 13, 2017

(65) Prior Publication Data
US 2019/0077887 A1 Mar. 14, 2019

(30) Foreign Application Priority Data
Oct. 8, 2015 (FR) .................................. 15 59593

(51) Int. Cl.
| | |
|---|---|
| C08C 19/25 | (2006.01) |
| C08C 19/22 | (2006.01) |
| B60C 1/00 | (2006.01) |
| C08K 5/31 | (2006.01) |
| C08K 5/548 | (2006.01) |
| C08L 15/00 | (2006.01) |
| C08C 19/44 | (2006.01) |
| C08K 3/06 | (2006.01) |
| C08K 5/18 | (2006.01) |
| C08K 3/22 | (2006.01) |
| C08K 3/36 | (2006.01) |
| C08L 57/02 | (2006.01) |
| C08K 5/09 | (2006.01) |
| C08F 136/06 | (2006.01) |
| C08F 236/10 | (2006.01) |

(52) U.S. Cl.
CPC .......... *C08C 19/25* (2013.01); *B60C 1/00* (2013.01); *B60C 1/0016* (2013.01); *C08C 19/22* (2013.01); *C08C 19/44* (2013.01); *C08F 136/06* (2013.01); *C08F 236/10* (2013.01); *C08K 3/06* (2013.01); *C08K 3/22* (2013.01); *C08K 3/36* (2013.01); *C08K 5/09* (2013.01); *C08K 5/18* (2013.01); *C08K 5/31* (2013.01); *C08K 5/548* (2013.01); *C08L 15/00* (2013.01); *C08L 57/02* (2013.01); *C08F 2438/00* (2013.01); *C08F 2500/21* (2013.01)

(58) Field of Classification Search
CPC ......... B60C 1/00; B60C 1/0016; C08L 57/02; C08L 15/00; C08C 19/25; C08C 19/44; C08C 19/22; C08F 136/06; C08F 236/10; C08F 2438/00; C08F 2500/21; C08K 5/548; C08K 5/31; C08K 5/18; C08K 5/09; C08K 3/36; C08K 3/22; C08K 3/06
USPC .......................................................... 524/66
See application file for complete search history.

(56) References Cited

U.S. PATENT DOCUMENTS

| | | | |
|---|---|---|---|
| 2016/0176991 A1 | 6/2016 | Dire et al. | |
| 2018/0194867 A1* | 7/2018 | Dire .................. | C08C 19/25 |

FOREIGN PATENT DOCUMENTS

WO    2015018599 A1    2/2015

OTHER PUBLICATIONS

International Search Report regarding PCT/EP2016/073949 dated Nov. 21, 2016.

* cited by examiner

*Primary Examiner* — Angela C Scott
(74) *Attorney, Agent, or Firm* — Dickinson Wright PLLC

(57) ABSTRACT

A modified diene elastomer having a good flow resistance, and imparting to a rubber composition containing the same a good compromise of hysteresis and abrasion properties and a satisfactory processing with a view to a tire application is provided. This modified elastomer comprises: a) at least 70% by weight of a linear diene elastomer predominantly functionalized in the middle of the chain by an alkoxysilane group, optionally partly or completely hydrolyzed to silanol, the alkoxysilane group optionally bearing another function capable of interacting with a reinforcing filler, the silicon atom of the alkoxysilane group lying in the main chain of the diene elastomer; b) more than 0 and up to 30% by weight of a star-branched diene elastomer, the Mooney viscosity of said modified diene elastomer varying from 50 to 80 and the glass transition temperature (Tg) thereof varying from −100° C. to −80° C.

21 Claims, 2 Drawing Sheets

DIENE ELASTOMER HAVING A FUNCTION IN THE MIDDLE OF THE CHAIN AND RUBBER COMPOSITION CONTAINING THE SAME

This application is a 371 national phase entry of PCT/EP2016/073949, filed 7 Oct. 2016, which claims benefit of French Patent Application No. 1559593, filed 8 Oct. 2015, the entire contents of which are incorporated herein by reference for all purposes.

BACKGROUND

1. Technical Field

The invention relates to a diene elastomer modified by an alkoxysilane group, optionally partially or completely hydrolysed, bearing or not bearing another function.

2. Related Art

Since savings in fuel and the need to protect the environment have become a priority, it is desirable to produce mixtures having a hysteresis which is as low as possible in order to be able to process them in the form of rubber compositions which can be used in the manufacture of various semi-finished products involved in the composition of tire casings, such as, for example, underlayers, sidewalls or treads, and in order to obtain tires having a reduced rolling resistance.

Ideally, for example, a tire tread must fulfil a great many technical requirements, which are often contradictory in nature, including increased wear resistance while affording the tire low rolling resistance.

Moreover, the reduction in the hysteresis of the mixtures, a hallmark of reduced rolling resistance, must also be achieved while preserving the suitability for processing, in particular in the raw state, of the mixtures, while also maintaining the resistance to flow of the elastomers.

Many solutions have already been experimented with in order to achieve the objective of a fall in hysteresis. Mention may in particular be made of the modification of the structure of diene polymers and copolymers at the end of polymerization by means of functionalization agents, coupling agents or star-branching agents with the aim of obtaining a good interaction between the polymer modified in this way and the filler, whether this is carbon black or a reinforcing inorganic filler.

Within the context of mixtures containing a reinforcing inorganic filler such as silica, it has been proposed to use diene polymers functionalized by alkoxysilane derivatives, especially by combining, or not combining, the functionalization by alkoxysilane functions with functionalization by other functions, especially amine, imine, epoxy or else thiol functions.

Thus, document WO 2007047943 A1 describes functionalization at the end of the polymer chain by reaction of a living elastomer with an alkoxysilane compound bearing a protected thiol function with a view to improving the hysteresis of the reinforced rubber compositions containing the functionalized elastomer.

The Applicants have described, in documents EP 0 692 492 A1 and EP 0 692 493 A1, the functionalization of diene elastomers at the end and in the middle of the chain by alkoxysilane compounds bearing an epoxy function, with a view to improving the reinforcement and also the hysteresis of the reinforced rubber compositions containing the functionalized elastomer.

Functionalization by alkoxysilane compounds bearing an amino function has been widely described in the patent literature. Elastomers functionalized at the chain end by alkoxysilane functions bearing an amino group have been combined equally well with silica and with carbon black, or even a mixture of these two fillers, in rubber compositions intended for the manufacture of tires.

The Applicants, for their part, have described, in document WO 2009133068 A1, a functionalized diene elastomer essentially composed of the coupled entity of an elastomer having, within the chain, a group bearing an alkoxysilane function and an amine function, the silicon atom of this group bonding the two parts of the diene elastomer chain. This elastomer functionalized in the middle of the chain confers improved mechanical and dynamic properties on the composition containing it, especially an improved hysteresis, while retaining a satisfactory raw processing, with a view especially to use in a tire tread.

Aside from the improvement in the hysteresis properties, which leads to a decrease in the rolling resistance of the tire, the increase in abrasion resistance, making it possible to assess the wear resistance of a tire, is another desired performance property for rubber compositions intended for the manufacture of tires.

In order to improve the wear resistance and abrasion resistance of a tire, it is known that a certain stiffness in the tread is desirable. However, experience shows that such stiffening of the tread frequently, and where appropriate often prohibitively, adversely affects the rolling resistance properties, since it is accompanied by a significant increase in the hysteresis losses of the rubber composition.

Moreover, it is an ongoing concern of designers of materials intended for the manufacture of tires to improve the compromise in mechanical and dynamic properties of the rubber compositions with a view to improving the performance of the tire containing them, without, however, detrimentally affecting the steps of its manufacture or the properties of the elastomer. Thus, for example, the improvement in the compromise in properties must not be made to the detriment of the flow of the elastomer, which causes major disadvantages during the transportation and storage of rubbers.

It has been proposed in the past to add elastomers coupled or star-branched using additional coupling or star-branching agents comprising tin or silicon in order to limit the flow. However, the combinations illustrated in the past do not always result in a reinforced rubber composition, the processing/hysteresis compromise of which is satisfactory for a tire application.

SUMMARY

The technical problem which the invention proposes to solve is that of further improving the compromise in hysteresis and abrasion properties of a rubber composition without detrimentally affecting the processing thereof, with a view to a tire application, or the properties of the elastomer contained in this composition, especially its resistance to flow.

This aim is achieved in that the inventors have just discovered, surprisingly, in the course of their research, that a modified diene elastomer comprising at least 70% by weight, relative to the total weight of the modified diene elastomer, of a linear diene elastomer functionalized predominantly in the middle of the chain by an alkoxysilane group, optionally partially or completely hydrolysed to give silanol, the alkoxysilane group optionally bearing another function, to where appropriate preferentially a primary, secondary or tertiary amine function, the alkoxysilane being bonded to the diene elastomer by means of the silicon atom, and at most 30% by weight, relative to the total weight of the modified diene elastomer, of a star-branched diene elastomer, the Mooney viscosity of said modified diene elastomer ranging from 50 to 80, and its glass transition temperature (Tg) ranging from −100° C. to −80° C., gives the rubber compositions containing it an improved raw processing/hysteresis/abrasion compromise while retaining the resistance to flow of the elastomer.

A subject of the invention is therefore a modified diene elastomer comprising:

a) at least 70% by weight, relative to the total weight of the modified diene elastomer, of a linear diene elastomer functionalized predominantly in the middle of the chain by an alkoxysilane group, optionally partially or completely hydrolysed to give silanol, the alkoxysilane group optionally bearing another function, the silicon atom being located in the main chain of the diene elastomer, and b) more than 0 and up to 30% by weight, relative to the total weight of the modified diene elastomer, of a star-branched diene elastomer, the Mooney viscosity of said modified diene elastomer ranging from 50 to 80, and the glass transition temperature ranging from −100° C. to −80° C., preferably from −95° C. to −80° C.

Another subject of the invention is a reinforced rubber composition based on at least one reinforcing filler and on an elastomer matrix comprising at least said modified diene elastomer.

BRIEF DESCRIPTION OF THE DRAWINGS

The drawings described herein are for illustrative purposes only of selected embodiments and are notintended to limit the scope of the present disclosure. The inventive concepts associated with the present disclosure will be more readily understood by reference to the following description in combination with the accompanying drawings wherein.

DETAILED DESCRIPTION OF EXAMPLE EMBODIMENTS

Figure 1:
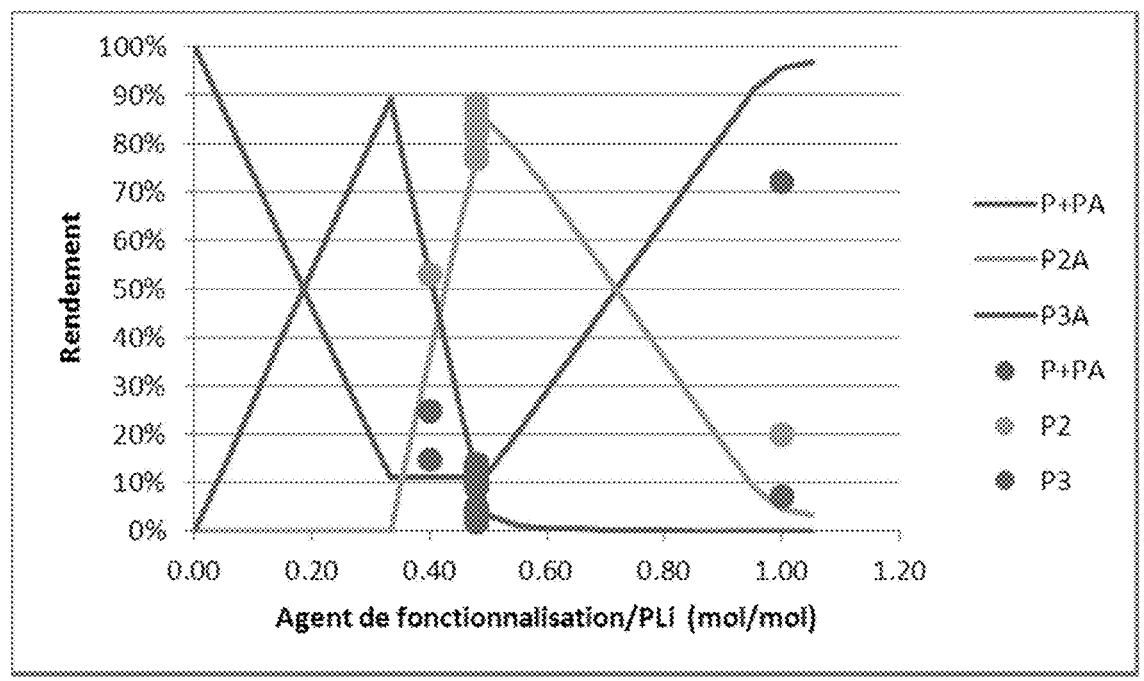
FIG. 1 is graph illustrating distribution of entities P, PA, $P_2A$ and $P_3A$ as a function of a functionalization agent/living polymer chains (PLi) molar ratio according to an example embodiment.

In the present description, unless expressly indicated otherwise, all the percentages (%) shown are % by weight. Furthermore, any range of values denoted by the expression "between a and b" represents the range of values extending from more than a to less than b (that is to say, limits a and b excluded), while any range of values denoted by the expression "from a to b" means the range of values extending from a up to b (that is to say, including the strict limits a and b).

The expression "composition based on" should be understood as meaning a composition comprising the mixture and/or the reaction product of the various constituents used, some of these base constituents being capable of reacting or intended to react with one another, at least in part, during the various phases of production of the composition, in particular during the crosslinking or vulcanization thereof.

In the present application, "predominantly" or "predominant", in connection with a compound, is understood to mean that this compound is predominant among the compounds of the same type in the composition, that is to say that it is the one which represents the biggest fraction by weight among the compounds of the same type. Thus, a "predominant" functional entity of a functionalized diene elastomer is that representing the biggest fraction by weight among the functionalized entities constituting the diene elastomer, relative to the total weight of the functionalized diene elastomer. In a system comprising just one compound of a certain type, the latter is predominant within the meaning of the present invention.

In the present description, Tg is intended to mean the glass transition temperature of a compound, especially of the modified diene elastomer of the invention, measured according to standard ASTM D3418.

In the present description, Mooney viscosity is intended to mean the ML(1+4)100° C. Mooney viscosity of a compound, especially of the modified diene elastomer of the invention, measured according to standard ASTM D1646.

In the present description, primary or secondary amine is intended to mean a primary or secondary amine protected or not protected by a protecting group known to those skilled in the art.

In the present description, the term "modified diene elastomer" is understood to mean a diene elastomer which comprises a group comprising one or more heteroatoms.

This group can be located at the end of the linear main elastomer chain. It will then be said that the diene elastomer is functionalized at the chain end. It is generally an elastomer obtained by reaction of a living elastomer with a functionalization agent, that is to say any at least monofunctional molecule, the function being any type of chemical group known by those skilled in the art to react with a living chain end.

This group can be located in the linear main elastomer chain. It will then be said that the diene elastomer is coupled or alternatively functionalized in the middle of the chain, in contrast to the position "at the chain end", although the group is not located precisely at the middle of the elastomer chain. It is generally an elastomer obtained by reaction of two chains of the living elastomer with a coupling agent, that is to say any at least difunctional molecule, the function being any type of chemical group known by those skilled in the art to react with a living chain end.

This group can be central, to which n elastomer chains (n>2) are bonded, forming a star-branched structure. It will then be said that the diene elastomer is star-branched. It is generally an elastomer obtained by reaction of n chains of the living elastomer with a star-branching agent, that is to say any polyfunctional molecule, the function being any type of chemical group known by those skilled in the art to react with a living chain end.

Those skilled in the art will understand that a functionalization reaction with an agent comprising more than one function which is reactive with regard to the living elastomer results in a mixture of entities functionalized at the chain end and in the middle of the chain, constituting the linear chains of the functionalized elastomer, and also, if appropriate, star-branched entities. Depending on the operating conditions, mainly the molar ratio of the functionalization agent to the living chains, certain entities are predominant in the mixture.

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds). More particularly, diene elastomer is intended to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms.

According to some variants, the diene elastomers contain from 95% to 100% by weight of diene units, and from 0 to 5% by weight of vinylaromatic units relative to the weight of the elastomer.

In the case of copolymers, they contain from 95% to less than 100% by weight, preferably from 96% to 99% by weight of diene units, and from more than 0 to 5% by weight, preferably from 1% to 4% by weight of vinylaromatic units, relative to the total weight of the copolymer.

The following are especially suitable as conjugated dienes which can be used in the process in accordance with the invention: 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene and 2,4-hexadiene, etc.

The following are especially suitable as vinylaromatic compounds: styrene, ortho-, meta- or para-methylstyrene, the "vinyltoluene" commercial mixture, para-(tert-butyl) styrene, methoxystyrenes, vinylmesitylene, divinylbenzene and vinylnaphthalene, etc.

The diene elastomer is preferentially selected from the group of highly unsaturated diene elastomers consisting of polybutadienes (BRs), synthetic polyisoprenes (IRs), butadiene copolymers, in particular copolymers of butadiene and of a vinylaromatic monomer, isoprene copolymers and the mixtures of these elastomers. Such copolymers are more particularly butadiene/styrene copolymers (SBRs), isoprene/butadiene copolymers (BIRs), isoprene/styrene copolymers (SIRs) and isoprene/butadiene/styrene copolymers (SBIRs). Among these polymers, butadiene homopolymers and butadiene/styrene copolymers (SBRs) are particularly preferred.

As butadiene homopolymers, polybutadienes, and in particular those having a content (mol %) of 1,2-units of between 4% and 20%, preferably from 10% to 15%, and having a cis-1,4-/trans-1,4-molar ratio ranging from 1 to 0.65, are particularly suitable.

As butadiene/styrene copolymer, butadiene/styrene copolymers having a styrene content of between 0 and 5% by weight and more particularly ranging from 1% to 4% by weight relative to the weight of the copolymer, and a content (mol %) of 1,2-bonds of the butadiene part of between 4% and 20%, preferably from 10% to 15%, are particularly suitable.

The diene elastomer may have any microstructure which depends on the polymerization conditions used. The copolymer may be a block, statistical, sequential or microsequential elastomer, etc., and may be prepared in dispersion or in solution. In the case of a copolymer based on a diene and on an aromatic vinyl, especially containing butadiene and styrene, the two monomers are preferentially distributed statistically.

The microstructure of these elastomers may be determined by the presence or absence of a polar agent and the amounts of polar agent employed during the anionic polymerization step. Preferentially, when the diene elastomer is based on a diene and styrene, a polar agent is used during the polymerization step in amounts such that it promotes the statistical distribution of the styrene along the polymer chains while retaining the content of 1,2-bonds at between 4% and 20%, preferably from 10% to 15%.

The diene elastomer functionalized in the middle of the chain a) and the star-branched diene elastomer b) may have, before functionalization and star-branching, the same microstructure or a different microstructure.

Preferably, the linear diene elastomer functionalized predominantly in the middle of the chain a) and the star-branched diene elastomer b) have, before functionalization and star-branching, the same microstructure.

Preferably again, the linear diene elastomer functionalized predominantly in the middle of the chain a) and the star-branched diene elastomer b) have, before functionalization and star-branching, the same microstructure and the same macrostructure.

The term "linear diene elastomer functionalized predominantly in the middle of the chain", i.e. the elastomer a), is intended to mean, according to the invention, the mixture of the linear entities of the functionalized elastomer, namely the linear chains functionalized at the chain end and the linear chains functionalized in the middle of the chain, the latter being predominant in this mixture and preferably representing at least 50% by weight of the total weight of the elastomer a), more preferentially still at least 80% by weight.

According to a preferred embodiment, the modified diene elastomer according to the invention comprises at least 75% by weight, or even at least 80% by weight, relative to the total weight of the modified diene elastomer, of the linear diene elastomer functionalized predominantly in the middle of the chain a).

According to another preferred embodiment, the modified diene elastomer according to the invention comprises at most 25%, or even at most 20% by weight, relative to the total weight of the modified diene elastomer, of the star-branched diene elastomer b).

According to yet another preferred embodiment, the modified diene elastomer according to the invention comprises at least 5% by weight, relative to the total weight of the modified diene elastomer, of the star-branched diene elastomer b).

According to an embodiment which is particularly preferred due to a raw processing/hysteresis/abrasion compromise which is improved while retaining the resistance to flow of the elastomer, the modified diene elastomer according to the invention comprises at least 75% by weight, relative to the total weight of the modified diene elastomer, of the linear diene elastomer functionalized predominantly in the middle of the chain a) and at most 25% by weight, relative to the total weight of the modified diene elastomer, of the star-branched diene elastomer b). More particularly, then, the modified diene elastomer according to the invention comprises at least 5% by weight, relative to the total weight of the modified diene elastomer, of the star-branched diene elastomer b).

The star-branched diene elastomer b) is preferably a tin-based or silicon-based star-branched diene elastomer.

The star-branched diene elastomer b) is preferably a star-branched diene elastomer comprising three or four branches.

According to one particularly preferred embodiment of the invention, the star-branched diene elastomer b) is a three-branched star-branched elastomer branched by a group comprising a silicon atom bearing, or not bearing, another function capable of interacting with a reinforcing filler, the silicon atom being substituted by the three branches of the diene elastomer. The substitution on the silicon atom is advantageously identical to that of the diene elastomer a), since as a result a single functionalization agent may be used.

According to a first variant of the invention, the diene elastomer a) does not comprise a function other than the alkoxysilane group, optionally partially or completely hydrolysed to give silanol, comprising the silicon atom directly bonded to the elastomer chain.

According to a second variant of the invention, the diene elastomer a) also comprises another function capable of interacting with a reinforcing filler, this function advantageously being borne by the silicon of the alkoxysilane group, directly or via a spacer group. This is understood as not excluding the fact that the alkoxysilane group comprising the silicon atom directly bonded to the elastomer chain interacts favourably with the reinforcing filler.

The term "alkoxysilane group interacting favourably with the reinforcing filler" or "function capable of interacting with a reinforcing filler" is understood to mean any other alkoxysilane group or function capable of forming, within a rubber composition reinforced by means of a filler, a physical or chemical bond with said filler. This interaction can be established, for example, via covalent, hydrogen, ionic and/or electrostatic bonds between said function and functions present on fillers.

The alkoxy radical of the alkoxysilane group may be of formula R'O—, where R' represents a substituted or unsubstituted $C_1$-$C_{10}$, or even $C_1$-$C_8$, alkyl group, preferably a $C_1$-$C_4$ alkyl group, more preferentially methyl and ethyl.

The term "function capable of interacting with a reinforcing filler" is preferably intended to mean functions comprising at least one heteroatom chosen from N, S, O or P. Mention may be made, by way of example, among these functions, of cyclic or non-cyclic primary, secondary or tertiary amines, isocyanates, imines, cyanos, thiols, carboxylates, epoxides or primary, secondary or tertiary phosphines.

Mention may thus be made, as secondary or tertiary amine function, of amines substituted by $C_1$-$C_{10}$, preferably $C_1$-$C_4$, alkyl radicals, more preferentially a methyl or ethyl radical, or else cyclic amines forming a heterocycle containing a nitrogen atom and at least one carbon atom, preferably from 2 to 6 carbon atoms. For example, the methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneamino-groups, preferably the diethylamino- and dimethylamino-groups, are suitable.

Mention may be made, as imine function, of the ketimines. For example, the (1,3-dimethylbutylidene) amino-, (ethylidene)amino-, (1-methylpropylidene)amino-, (4-N,N-dimethylaminobenzylidene)amino-, (cyclohexylidene)amino-, dihydroimidazole and imidazole groups are suitable.

Mention may thus be made, as carboxylate function, of acrylates or methacrylates. Such a function is preferably a methacrylate.

Mention may be made, as epoxide function, of the epoxy or glycidyloxy groups.

Mention may be made, as secondary or tertiary phosphine function, of phosphines substituted by $C_1$-$C_{10}$, preferably $C_1$-$C_4$, alkyl radicals, more preferentially a methyl or ethyl radical, or else diphenylphosphine. For example, the methylphosphino-, dimethylphosphino-, ethylphosphino-, diethylphosphino, ethylmethylphosphino- and diphenylphosphino-groups are suitable.

According to the second variant of the invention, the other function capable of interacting with a reinforcing filler may be directly bonded to the silicon atom itself directly bonded to the diene elastomer.

According to the second variant of the invention, the other function capable of interacting with a reinforcing filler and the silicon atom directly bonded to the diene elastomer may be bonded via a spacer group which may be an atom or a group of atoms. The spacer group may be a saturated or unsaturated, cyclic or non-cyclic, linear or branched, divalent $C_1$-$C_{18}$ aliphatic hydrocarbon-based radical or a divalent $C_6$-$C_{18}$ aromatic hydrocarbon-based radical and may contain one or more aromatic radicals and/or one or more heteroatoms. The hydrocarbon-based radical may optionally be substituted.

Preferably, the spacer group is a linear or branched, divalent $C_1$-$C_{18}$ aliphatic hydrocarbon-based radical, more preferentially a linear divalent hydrocarbon-based radical and more preferentially still the linear divalent $C_2$ or $C_3$ hydrocarbon-based radical.

The above different preferential or non-preferential aspects which relate especially to the nature of the other function capable of interacting with a reinforcing filler, the nature of the spacer group, the nature of the diene elastomer, the nature of the function comprising the silicon atom and the proportions of the different entities, can be combined with one another as long as they are compatible.

Very preferentially, according to the second variant, according to which the diene elastomer a) also comprises another function capable of interacting with a reinforcing filler, the other function capable of interacting with a reinforcing filler is a primary, secondary or tertiary amine. This use of the second variant of the invention is particularly advantageous due to the improvement in the hysteresis properties.

Preferably, the function capable of interacting with a reinforcing filler is a tertiary amine function, more preferentially diethylamine or dimethylamine.

According to advantageous variants of the invention, at least any one, at least two, at least three, at least four, at least five and preferably all of the following characteristics is (are) complied with:

the star-branched diene elastomer b) is a three-branched star-branched elastomer branched by a group comprising a silicon atom bearing another function capable of interacting with a reinforcing filler, the other function capable of interacting with a reinforcing filler is a tertiary amine, more particularly a diethylamino- or dimethylamino-group, the spacer group is a linear $C_1$-$C_{18}$ hydrocarbon-based radical, more preferentially still the linear $C_2$ or $C_3$ hydrocarbon-based radical, the alkoxysilane group is a methoxysilane or ethoxysilane, optionally partially or completely hydrolysed to give silanol, the diene elastomer is a butadiene polymer, more particularly a butadiene homopolymer or a butadiene/styrene copolymer, the modified diene elastomer comprises at least 75% by weight of the linear diene elastomer functionalized predominantly in the middle of the chain a) and at most 25% by weight of the star-branched diene elastomer b), relative to the total weight of the modified diene elastomer.

Thus, very preferentially, the modified elastomer according to the invention is a diene elastomer, for which:

the star-branched diene elastomer b) is a three-branched star-branched elastomer branched by a group comprising a silicon atom bearing a diethylamino- or dimethylamino-group, the spacer group is a linear $C_3$ hydrocarbon-based radical, the alkoxysilane group is a methoxysilane or ethoxysilane, optionally partially or completely hydrolysed to give silanol, the diene elastomer is a butadiene homopolymer or a butadiene/styrene copolymer, the modified diene elastomer comprises at least 75% by weight of the linear diene elastomer functionalized predominantly in the middle of the chain a) and at most 25% by weight of the star-branched diene elastomer b), relative to the total weight of the modified diene elastomer.

The modified diene elastomer according to the invention may be obtained by means of a process as described below.

According to any one of the variants of the invention, the first step of this process for the preparation of the modified diene elastomer is the anionic polymerization of at least one conjugated diene monomer in the presence of a polymerization initiator.

Use may be made, as polymerization initiator, of any known monofunctional anionic initiator. However, an initiator containing an alkali metal, such as lithium, is preferentially used.

Organolithium initiators comprising a carbon-lithium bond are especially suitable. Use will preferably be made of a hydrocarbon-based organolithium initiator not comprising a heteroatom. Representative compounds are aliphatic organolithium compounds, such as ethyllithium, n-butyllithium (n-BuLi), isobutyllithium, etc. Organolithium initiators comprising an amine-lithium bond are also suitable. Representative compounds are lithium amides obtained from a cyclic secondary amine, such as pyrrolidine and hexamethyleneimine.

The polymerization is preferably carried out in the presence of an inert hydrocarbon-based solvent which may, for example, be an aliphatic or alicyclic hydrocarbon, such as pentane, hexane, heptane, isooctane, cyclohexane or methylcyclohexane, or an aromatic hydrocarbon, such as benzene, toluene or xylene.

The polymerization can be carried out continuously or batchwise.

The polymerization is generally carried out at a temperature of between 20° C. and 150° C. and preferably in the vicinity of 30° C. to 120° C. It is, of course, also possible to add, at the end of polymerization, a transmetallation agent for modifying the reactivity of the living chain end.

The living diene elastomer resulting from the polymerization is subsequently functionalized in order to prepare the modified diene elastomer according to the invention.

According to a first variant of the preparation of the modified diene elastomer according to the invention, the linear diene elastomer functionalized predominantly in the middle of the chain a) and the star-branched diene elastomer b) are mixed in the appropriate proportions.

The diene elastomer functionalized in the middle of the chain a) may advantageously be obtained by reaction of the living chain end with a coupling agent capable of introducing, into the middle of the chain, an alkoxysilane group, optionally partially or completely hydrolysed to give silanol, bearing or not bearing another function; where appropriate, when the other function is an amine, the functionalization in the middle of the chain of the diene elastomer a) may be obtained especially according to the procedures described in patent application WO2009133068A1, the description of which is incorporated by reference.

The star-branched diene elastomer b) may be obtained in a way known per se by reaction of the living chain end with a star-branching agent, that is to say any polyfunctional molecule, the function being any type of chemical group known by those skilled in the art to react with a living chain end.

The mixing of the two elastomers may be carried out in an inert solvent, for example an aliphatic or alicyclic hydrocarbon, such as pentane, hexane, heptane, isooctane or cyclohexane, or an aromatic hydrocarbon, such as benzene, toluene or xylene, which can be the same as the polymerization solvent. The mixing will then be carried out at a temperature of between 20° C. and 120° C. and preferably in the vicinity of 30° C. to 110° C.

According to a second variant of the preparation of the modified diene elastomer according to the invention, the living diene elastomer resulting from the polymerization step is subjected to the reaction of a star-branching agent and to that of a coupling agent capable of introducing, into the middle of the polymer chain, an alkoxysilane group, which may or may not be hydrolysed to give silanol, by substitution of the silicon atom by one or two chains of the diene elastomer, the alkoxysilane group optionally bearing another function capable of interacting with a reinforcing filler within a rubber composition.

The coupling agent which can be used according to these two synthesis variants of the invention bears an alkoxysilane function, which may be hydrolysed to give a silanol function, or else a non-hydrolysable alkoxysilane function, and optionally a function capable of interacting with a reinforcing filler, the two functions being directly bonded to one another or being bonded via a spacer group. The function capable of interacting with a reinforcing filler and the spacer group are as defined above.

The coupling agent may be represented by the following formula (I):

in which:

Y is a saturated or unsaturated, cyclic or non-cyclic, divalent $C_1$-$C_{18}$ aliphatic or $C_6$-$C_{18}$ aromatic hydrocarbon-based radical, preferably a linear or branched, divalent $C_1$-$C_{18}$ aliphatic hydrocarbon-based radical, more preferentially a linear divalent aliphatic hydrocarbon-based radical and more preferentially still the linear $C_2$ or $C_3$ hydrocarbon-based radical, X is a hydrogen atom or a function capable of interacting with a reinforcing filler, the R' radicals, which are substituted or unsubstituted and identical or different, represent a $C_1$-$C_{10}$, or even $C_1$-$C_8$, alkyl group, preferably a $C_1$-$C_4$ alkyl group, more preferentially methyl and ethyl.

The function capable of interacting with a reinforcing filler is as defined above.

The function capable of interacting with a reinforcing filler is preferentially a primary, secondary or tertiary amine function.

In the case of the primary amine, the nitrogen atom may then be substituted by two protecting groups, especially two trialkylsilyl radicals, the alkyl group having 1 to 4 carbon atoms.

In the case of the secondary amine, the nitrogen atom may then be substituted by a protecting group, especially a trialkylsilyl radical, the alkyl group having 1 to 4 carbon atoms, and a $C_1$-$C_{10}$, preferably $C_1$-$C_4$, alkyl radical, more preferentially a methyl or ethyl radical.

In the case of a tertiary amine, the nitrogen atom may then be substituted by two protecting groups, which are identical or different, possibly being a $C_1$-$C_{10}$, preferably $C_1$-$C_4$ alkyl radical, more preferentially a methyl or ethyl radical, or else the two substituents of the nitrogen form with said nitrogen a heterocycle containing a nitrogen atom and at least one carbon atom, preferably from 2 to 6 carbon atoms.

Mention may be made, for example, as coupling agent, of alkyltrialkoxysilanes, (N,N-dialkylaminopropyl)trialkoxysilanes, (N-alkylaminopropyl)trialkoxysilanes, the secondary amine function of which is protected by a trialkylsilyl group, and (aminopropyl)trialkoxysilanes, the primary amine function of which is protected by two trialkylsilyl groups.

Preferentially, the coupling agent may be chosen from (3-N,N-dimethylaminopropyl)trimethoxysilane, (3-N,N-dimethylaminopropyl)triethoxysilane, (3-N,N-diethylaminopropyl)trimethoxysilane, (3-N,N-diethylaminopropyl)triethoxysilane, (3-N,N-dipropylaminopropyl)trimethoxysilane, (3-N,N-dipropylaminopropyl)triethoxysilane, (3-N,N-dibutylaminopropyl)trimethoxysilane, (3-N,N-dibutylaminopropyl)triethoxysilane, (3-N,N-dipentylaminopropyl)trimethoxysilane, (3-N,N-dipentylaminopropyl)triethoxysilane, (3-N,N-dihexylaminopropyl)trimethoxysilane, (3-N,N-dihexylaminopropyl)triethoxysilane, (3-hexamethyleneaminopropyl)trimethoxysilane, (3-hexamethyleneaminopropyl)triethoxysilane, (3-morpholinopropyl)trimethoxysilane, (3-morpholinopropyl)triethoxysilane, (3-piperidinopropyl)trimethoxysilane or (3-piperidinopropyl)triethoxysilane. More preferentially, the coupling agent is (3-N,N-dimethylaminopropyl)trimethoxysilane.

Preferentially, the coupling agent may be chosen from (3-N,N-methyltrimethylsilylaminopropyl)trimethoxysilane, (3-N,N-methyltrimethylsilylaminopropyl)triethoxysilane, (3-N,N-ethyltrimethylsilylaminopropyl)trimethoxysilane, (3-N,N-ethyltrimethylsilylaminopropyl)triethoxysilane, (3-N,N-propyltrimethylsilylaminopropyl)trimethoxysilane or (3-N,N-propyltrimethylsilylaminopropyl)triethoxysilane. More preferentially, the coupling agent is (3-N,N-methyltrimethylsilylaminopropyl)trimethoxysilane.

Preferentially, the coupling agent can be chosen from (3-N,N-bis(trimethylsilyl)aminopropyl)trimethoxysilane and (3-N,N-bis(trimethylsilyl)aminopropyl)triethoxysilane. More preferentially, the coupling agent is (3-N,N-bis(trimethylsilyl)aminopropyl)trimethoxysilane.

Advantageously, when the function capable of interacting with a reinforcing filler is an amine function, the latter is tertiary and the coupling agent is then preferentially (3-N, N-dimethylaminopropyl)trimethoxysilane.

The function capable of interacting with a reinforcing filler may also be an isocyanate function. Preferentially, then, the functionalization agent is chosen from (3-isocyanatopropyl)trimethoxysilane and (3-isocyanatopropyl)triethoxysilane.

The function capable of interacting with a reinforcing filler may also be an imine function. Preferentially, then, the functionalization agent is chosen from N-(1,3-dimethylbutylidene)-3-(trimethoxysilyl)-1-propanamine, N-(1,3-dimethylbutylidene)-3-(triethoxysilyl)-1-propanamine, N-(1,3-methylethylidene)-3-(trimethoxysilyl)-1-propanamine, N-(1,3-methylethylidene)-3-(triethoxysilyl)-1-propanamine, N-ethylidene-3-(trimethoxysilyl)-1-propanamine, N-ethylidene-3-(triethoxysilyl)-1-propanamine, N-(1-methylpropylidene)-3-(trimethoxysilyl)-1-propanamine, N-(1-methylpropylidene)-3-(triethoxysilyl)-1-propanamine, N-(4-N,N-dimethylaminobenzylidene)-3-(trimethoxysilyl)-1-propanamine, N-(4-N,N-dimethylaminobenzylidene)-3-(triethoxysilyl)-1-propanamine, N-(cyclohexylidene)-3-(trimethoxysilyl)-1-propanamine, N-(cyclohexylidene)-3-(triethoxysilyl)-1-propanamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole or N-(3-triethoxysilylpropyl)-4,5-imidazole.

The function capable of interacting with a reinforcing filler may also be a cyano function. Preferentially, then, the functionalization agent is chosen from (3-cyanopropyl)trimethoxysilane and (3-cyanopropyl)triethoxysilane.

The function capable of interacting with a reinforcing filler may also be a protected or unprotected thiol function. Mention may be made, by way of example, of (S-trialkylsilylmercaptoalkyl)trialkoxysilanes. Preferentially, then, the functionalization agent is chosen from (S-trimethylsilylmercaptopropyl)trimethoxysilane, (S-trimethylsilylmercaptopropyl)triethoxysilane, (S-tert-butyldimethylsilylmercaptopropyl)trimethoxysilane, (S-tert-butyldimethylsilylmercaptopropyl)triethoxysilane, (S-trimethylsilylmercaptoethyl)trimethoxysilane, (S-trimethylsilylmercaptoethyl)triethoxysilane, (S-tert-butyldimethylsilylmercaptoethyl)trimethoxysilane or (5-tert-butyldimethylsilylmercaptoethyl)triethoxysilane.

The function capable of interacting with a reinforcing filler may also be a carboxylate function. Mention may be made, as carboxylate function, of acrylates or methacrylates. Such a function is preferably a methacrylate. Preferentially, then, the functionalization agent is chosen from (3-methacryloyloxypropyl)trimethoxysilane and (3-methacryloyloxypropyl)triethoxysilane.

The function capable of interacting with a reinforcing filler may also be an epoxide function. Preferentially, then, the functionalization agent is chosen from (2-glycidyloxyethyl)trimethoxysilane, (2-glycidyloxyethyl)triethoxysilane, (3-glycidyloxypropyl)trimethoxysilane, (3-glycidyloxypropyl)triethoxysilane, 2-(3,4-epoxycyclohexyl)ethyltrimethoxysilane and 2-(3,4-epoxycyclohexyl)ethyltriethoxysilane. The function capable of interacting with a reinforcing filler may also be a protected or unprotected primary phosphine function, a protected or unprotected secondary phosphine function or a tertiary phosphine function. Preferentially, then, the functionalization agent is chosen from (3-P,P-bistrimethylsilylphosphinopropyl) trimethoxysilane, (3-P,P-bistrimethylsilylphosphinopropyl) triethoxysilane, (3-methyltrimethylsilylphosphinopropyl) trimethoxysilane, (3-methyltrimethylsilylphosphinopropyl) triethoxysilane, (3-ethyltrimethylsilylphosphinopropyl) trimethoxysilane, (3-ethyltrimethylsilylphosphinopropyl) triethoxysilane, (3-dimethylphosphinopropyl) trimethoxysilane, (3-dimethylphosphinopropyl) triethoxysilane, (3-diethylphosphinopropyl) trimethoxysilane, (3-diethylphosphinopropyl) triethoxysilane, (3-ethylmethylphosphinopropyl) trimethoxysilane, (3-ethylmethylphosphinopropyl) triethoxysilane, (3-diphenylphosphinopropyl) trimethoxysilane or (3-diphenylphosphinopropyl) triethoxysilane.

The molar ratio of the coupling agent to the initiator of the living polymer chains varies from 0.30 to 0.80, preferentially from 0.40 to 0.65 and even more preferentially from 0.45 to 0.55.

According to any one of the variants of the preparation of the modified diene elastomer of the invention, the star-branching agents are preferentially tin-based or silicon-based agents with a functionality of greater than 2. Such star-branching agents are known to those skilled in the art. They not only comprise trihalo tin and silicon compounds such as $SnR1X'3$, $SnHX'3$, $SiR1X'3$, $SiHX'3$, but also $SnX'4$, $SiX'4$, or even also alkoxylated silicon compounds, especially trialkoxysilanes, unsubstituted or substituted with a function capable of interacting with a reinforcing filler. In these formulae R1 is an alkyl or aralkyl group having from 1 to 20 carbon atoms and X' is a halogen, preferentially Cl, and the function capable of interacting with a reinforcing filler is as defined above.

According to a particularly advantageous embodiment of the second variant of the preparation of the modified diene elastomer according to the invention, the coupling agent and the star-branching agent are one and the same compound. According to this advantageous embodiment, the functionalization may be carried out continuously and especially according to the procedures described in Application WO 2015018599 A1.

According to another embodiment of the second variant of the preparation of the modified diene elastomer according to the invention, the coupling agent and the star-branching agent are distinct. According to this particular embodiment, the functionalization of the living diene elastomer resulting from the polymerization step may be carried out at a temperature varying from 20° C. to 120° C., in the presence, to begin with, of an appropriate amount of a star-branching agent in order to star-branch at most 30% by weight of the living diene elastomer. Then, subsequently, the remaining living chains of the diene elastomer are functionalized by addition of a coupling agent capable of introducing, in the middle of the polymer chain, the alkoxysilane group bearing or not bearing a function, preferentially a primary, secondary or tertiary amine, capable of interacting with a reinforcing filler within a rubber composition and reaction with this agent.

According to the variants of the invention according to which the functionalization agent bears a protected primary amine function or protected secondary amine function, the synthesis process may be continued by a step of deprotection of the primary or secondary amine. This step is carried out after the modification reaction. The chains functionalized by the protected amine group can, by way of example, be reacted with an acid, a base, a fluorinated derivative, such as tetrabutylammonium fluoride, a silver salt, such as silver nitrate, etc., in order to deprotect this amine function. These different methods are described in the work "Protective Groups in Organic Synthesis", T. W. Green and P. G. M. Wuts, Third Edition, 1999. This deprotection step can have the effect of hydrolysing all or a portion of the hydrolysable alkoxysilane functions of the modified diene elastomer in order to convert them into silanol functions.

According to the variants of the invention according to which the functionalization agent bears a protected thiol function, the synthesis process can be continued by a step of deprotection of the thiol. This step is carried out after the modification reaction. The chains functionalized by the protected thiol group can, by way of example, be reacted with water, an alcohol or an acid (hydrochloric acid, sulfuric acid, carboxylic acid). This deprotection step can have the effect of hydrolysing all or a portion of the hydrolysable alkoxysilane functions of the modified diene elastomer in order to convert them into silanol functions.

According to the variants of the invention according to which the functionalization agent bears a protected primary or secondary phosphine function, the synthesis process can be continued by a step of deprotection of the phosphine. This step is carried out after the modification reaction. The chains functionalized by the protected phosphine group can, by way of example, be reacted with water, an alcohol or an acid (hydrochloric acid, sulfuric acid, carboxylic acid). This deprotection step can have the effect of hydrolysing all or a portion of the hydrolysable alkoxysilane functions of the modified diene elastomer in order to convert them into silanol functions.

According to variants of the invention, the synthesis process can comprise a step of hydrolysis of the hydrolysable alkoxysilane functions by addition of an acidic, basic or neutral compound, as described in the document EP 2 266 819 A1. The hydrolysable functions are then entirely or partially converted into silanol functions. At least 50 mol %, or even at least 80 mol %, and up to 100 mol % of the functions can thus be hydrolysed.

The process for the synthesis of the modified diene elastomer according to the invention can be continued in a way known per se by the steps of recovery of the modified elastomer.

According to variants of this process, these steps comprise a stripping step for the purpose of recovering the elastomer resulting from the prior steps in dry form. This stripping step can have the effect of hydrolysing all or a portion of the hydrolysable alkoxysilane functions of the modified diene elastomer in order to convert them into silanol functions. Advantageously, at least 50 mol % of the functions may thus be hydrolysed.

Those skilled in the art will understand that these steps can be combined with one another as long as they are compatible. Thus, the process for the synthesis of the modified diene elastomer according to the invention may comprise all or a portion of these steps of deprotection, specific hydrolysis and stripping, which follow the modification step.

The modified diene elastomer in accordance with the invention has satisfactory resistance to flow, which induces good stability during the storage and transportation of this rubber.

The modified diene elastomer according to the invention may advantageously be used, for a tire application, in a rubber composition reinforced by at least one inorganic filler such as silica, for which it improves the raw processing/hysteresis/abrasion resistance compromise. This rubber composition is also a subject of the invention.

Thus, as explained above, another subject of the invention is a reinforced rubber composition based on at least one reinforcing filler and on an elastomer matrix comprising at least one modified diene elastomer as described above.

It should be understood that the rubber composition may comprise one or more of these modified diene elastomers according to the invention.

The reinforced rubber composition according to the invention can be provided in the crosslinked state or in the non-crosslinked, in other words crosslinkable, state.

Advantageously, the rubber composition comprises, as modified elastomer according to the invention, a diene elastomer for which at least any one, at least two, at least three, at least four, at least five, and preferably all, of the following characteristics is complied with:
- the star-branched diene elastomer b) is a three-branched star-branched elastomer branched by a group comprising a silicon atom bearing another function capable of interacting with a reinforcing filler,
- the other function capable of interacting with a reinforcing filler is a tertiary amine, more particularly a diethylamino- or dimethylamino-group,
- the spacer group is a linear $C_1$-$C_{18}$ hydrocarbon-based radical, more preferentially still the linear $C_2$ or $C_3$ hydrocarbon-based radical,
- the function comprising the silicon atom is a methoxysilane or ethoxysilane, optionally partially or completely hydrolysed to give silanol,
- the diene elastomer is a butadiene polymer, more particularly a butadiene homopolymer or a butadiene/styrene copolymer,
- the modified diene elastomer comprises at least 75% by weight of the linear diene elastomer functionalized predominantly in the middle of the chain a) and at most 25% by weight of the star-branched diene elastomer b), relative to the total weight of the modified diene elastomer.

Preferentially, the rubber composition comprises, as modified elastomer according to the invention, a diene elastomer for which:
- the star-branched diene elastomer b) is a three-branched star-branched elastomer branched by a group comprising a silicon atom bearing a diethylamino- or dimethylamino-group,
- the other function capable of interacting with a reinforcing filler is a tertiary amine, more particularly a diethylamino- or dimethylamino-group,
- the spacer group is a linear $C_3$ hydrocarbon-based radical,
- the alkoxysilane group is a methoxysilane or ethoxysilane, optionally partially or completely hydrolysed to give silanol,
- the diene elastomer is a butadiene homopolymer or a butadiene/styrene copolymer,
- the modified diene elastomer comprises at least 75% by weight of the linear diene elastomer functionalized predominantly in the middle of the chain a) and at most 25% by weight of the star-branched diene elastomer b), relative to the total weight of the modified diene elastomer.

The modified diene elastomer according to the invention may, according to different variants, be used alone in the composition or as a blend with at least one other conventional diene elastomer, whether it is star-branched, coupled, functionalized or not. Preferentially, this other diene elastomer used in the invention is selected from the group of diene elastomers consisting of polybutadienes (BRs), synthetic polyisoprenes (IRs), natural rubber (NR), butadiene copolymers, isoprene copolymers and the mixtures of these elastomers. Such copolymers are more preferentially selected from the group consisting of butadiene/styrene copolymers (SBRs), ethylene/butadiene copolymers (EBRs), isoprene/butadiene copolymers (BIRs), isoprene/styrene copolymers (SIRs) and isoprene/butadiene/styrene copolymers (SBIRs). It is also possible to envisage a blend with any synthetic elastomer other than a diene elastomer, indeed even with any polymer other than an elastomer, for example a thermoplastic polymer.

When the conventional elastomer used as a blend is natural rubber and/or one or more diene polymers, such as, for example, polybutadienes, polyisoprenes or butadiene/styrene or butadiene/styrene/isoprene copolymers, this elastomer or these elastomers, modified or unmodified, can then be present at from 1 to 70 parts by weight per 100 parts of modified diene elastomer according to the invention.

It should be noted that the improvement in the properties of the composition according to the invention will be greater as the proportion of the elastomer(s) different from the modified diene elastomers of the invention in this composition becomes lower.

Thus, preferably, the elastomer matrix predominantly comprises by weight the modified diene elastomer according to the invention.

More preferentially, the elastomer matrix is composed solely of the modified diene elastomer according to the invention.

The rubber composition of the invention comprises, besides at least one elastomer matrix as described above, at least one reinforcing filler.

Use may be made of any type of reinforcing filler known for its abilities to reinforce a rubber composition which can be used in the manufacture of tire treads, for example carbon black, a reinforcing inorganic filler, such as silica, with which is combined, in a known way, a coupling agent, or also a mixture of these two types of filler.

All carbon blacks, used individually or in the form of mixtures, especially blacks of the HAF, ISAF or SAF type, conventionally used in the treads of tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks.

"Reinforcing inorganic filler" should be understood, in the present application, by definition, as any inorganic or mineral filler, regardless of its colour and its origin (natural or synthetic), capable of reinforcing by itself alone, without means other than an intermediate coupling agent, a rubber composition intended for the manufacture of tires; such a filler is generally characterized, in a known way, by the presence of hydroxyl (—OH) groups at its surface.

Mineral fillers of the siliceous type, in particular silica (Sift), or of the aluminous type, in particular alumina ($Al_2O_3$), are especially suitable as reinforcing inorganic fillers. The silica used may be any reinforcing silica known to those skilled in the art, especially any precipitated or fumed silica having a BET surface area and a CTAB specific surface area both of less than 450 m²/g, preferably from 30 to 400 m²/g, especially between 60 and 300 m²/g. Mention will also be made of mineral fillers of the aluminous type, in particular alumina ($Al_2O_3$) or aluminium (oxide) hydroxides, or also reinforcing titanium oxides, for example described in U.S. Pat. Nos. 6,610,261 and 6,747,087. Also suitable as reinforcing fillers are reinforcing fillers of another nature, especially carbon black, provided that these reinforcing fillers are covered with a siliceous layer or else comprise, at their surface, functional sites, especially hydroxyl sites, requiring the use of a coupling agent in order to establish the bond between the filler and the elastomer. By way of example, mention may be made, for example, of carbon blacks for tires, such as described, for example, in patent documents WO 96/37547 and WO 99/28380.

The physical state in which the reinforcing inorganic filler is provided is not important, whether it is in the form of a powder, of micropearls, of granules, of beads or any other appropriate densified form. Of course, the term "reinforcing inorganic filler" is also understood to mean mixtures of different reinforcing fillers, in particular of highly dispersible siliceous fillers as described above.

Preferentially, the content of total reinforcing filler (carbon black and/or other reinforcing filler, such as silica) is between 10 and 200 phr, more preferentially between 30 and 150 phr and even more preferentially between 70 and 130 phr, the optimum being, in a known way, different according to the particular applications targeted.

According to a variant of the invention, the reinforcing filler is predominantly other than carbon black, that is to say that it comprises more than 50% by weight of the total weight of the reinforcing filler of one or more fillers other than carbon black, especially a reinforcing inorganic filler, such as silica, or even it consists exclusively of such a filler.

According to this variant, when carbon black is also present, it may be used at a content of less than 20 phr, more preferentially of less than 10 phr (for example between 0.5 and 20 phr, especially from 1 to 10 phr).

According to another variant of the invention, use is made of a reinforcing filler predominantly comprising carbon black and optionally silica or another inorganic filler.

When the reinforcing filler comprises a filler requiring the use of a coupling agent in order to establish the bond between the filler and the elastomer, the rubber composition according to the invention also conventionally comprises an agent capable of effectively providing this bond. When silica is present in the composition as reinforcing filler, use may be made, as coupling agents, of organosilanes, especially alkoxysilane polysulfides or mercaptosilanes, or else of at least bifunctional polyorganosiloxanes.

Such a coupling agent should not be confused with the coupling agent used for the synthesis of the modified diene elastomer described above.

In the composition according to the invention, the content of coupling agent is advantageously less than 20 phr, it being understood that it is generally desirable to use as little of it as possible. Its content is preferentially between 0.5 and 12 phr. The presence of the coupling agent depends on the presence of the reinforcing inorganic filler. The content thereof is easily adjusted by those skilled in the art according to the content of this filler; it is typically of the order of 0.5% to 15% by weight relative to the amount of reinforcing inorganic filler other than carbon black.

The rubber composition according to the invention can also comprise, in addition to the coupling agents, coupling activators, agents for covering the fillers or more generally processing aids capable, in a known way, by virtue of an improvement in the dispersion of the filler in the rubber matrix and of a lowering of the viscosity of the composition, of improving its ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

The rubber compositions in accordance with the invention can also contain reinforcing organic fillers which can replace all or a portion of the carbon blacks or of the other reinforcing inorganic fillers described above. Mention may be made, as examples of reinforcing organic fillers, of functionalized polyvinyl organic fillers, such as described in Applications WO-A-2006/069792, WO-A-2006/069793, WO-A-2008/003434 and WO-A-2008/003435.

The rubber composition according to the invention may also comprise all or a portion of the usual additives generally used in elastomer compositions intended for the manufacture of tires, such as, for example, pigments, non-reinforcing fillers, protective agents, such as antiozone waxes, chemical antiozonants, antioxidants, antifatigue agents, plasticizing agents, reinforcing or plasticizing resins, methylene acceptors (for example, phenolic novolac resin) or methylene donors (for example, HMT or H3M), such as described, for example, in application WO 02/10269, a crosslinking system based either on sulfur or on sulfur donors and/or on peroxide and/or on bismaleimides, vulcanization accelerators or vulcanization activators.

The composition is manufactured in appropriate mixers, using two successive phases of preparation well known to those skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for the preparation of a composition according to the invention generally comprises:

(i) the implementation, at a maximum temperature of between 130° C. and 180° C., of a first step of thermomechanical working of the constituents of the composition comprising the modified diene elastomer according to the invention and a reinforcing filler, with the exception of a crosslinking system, then (ii) the implementation, at a temperature lower than said maximum temperature of said first step, of a second step of mechanical working during which said crosslinking system is incorporated.

This process may also comprise, prior to the implementation of the abovementioned steps (i) and (ii), the steps of the preparation of the modified diene elastomer according to the process described above.

Another subject of the invention is a semi-finished article made of rubber for a tire, comprising a rubber composition according to the invention, which is crosslinkable or crosslinked, or consisting of such a composition.

The final composition thus obtained may subsequently be calendered, for example in the form of a sheet or of a slab, or else extruded, for example in order to form a rubber profiled element which can be used as semi-finished product made of rubber intended for the tire.

Due to the improved hysteresis/raw processing/abrasion compromise while maintaining the resistance to flow of the elastomer which characterizes a reinforced rubber composition according to the invention, it should be noted that such a composition may constitute any semi-finished product of the tire and very particularly the tread, reducing especially its rolling resistance and improving wear resistance.

A final subject of the invention is thus a tire comprising a semi-finished article according to the invention, in particular a tread.

The abovementioned characteristics of the present invention, and also others, will be better understood on reading the following description of several exemplary embodiments of the invention, given by way of illustration and without limitation.

EXAMPLES

Measurements and Tests Used

Size-Exclusion Chromatography

The SEC (Size Exclusion Chromatography) technique makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) may be determined from commercial standards and the polydispersity index (PI=Mw/Mn) can be calculated via a "Moore" calibration.

There is no specific treatment of the polymer sample before analysis. The latter is simply dissolved in the elution solvent at a concentration of approximately 1 g·l$^{-1}$. The solution is then filtered through a filter with a porosity of 0.45 µm before injection.

The apparatus used is a Waters Alliance chromatographic line. The elution solvent is either tetrahydrofuran or tetrahydrofuran +1 vol % of diisopropylamine +1 vol % of triethylamine, the flow rate is 1 ml·min$^{-1}$, the temperature of the system is 35° C. and the analytical time is 30 min. A set of two Waters columns with the Styragel HT6E trade name is used. The volume of the solution of the polymer sample injected is 100 µl. The detector is a Waters 2410 differential refractometer and the software for making use of the chromatographic data is the Waters Empower system.

The calculated average molar masses are relative to a calibration curve produced for SBRs having the following microstructure: 25% by weight (relative to the weight of the polymer) of units of styrene type, 23% by weight (relative to the butadiene part) of units of 1,2-type and 50% by weight (relative to the butadiene part) of units of trans-1,4-type.

High-Resolution Size Exclusion Chromatography

The high-resolution SEC technique is used to determine the percentages by weight of the various populations of chains present in a polymer sample.

There is no specific treatment of the polymer sample before analysis. The latter is simply dissolved in the elution solvent at a concentration of approximately 1 g·l$^{-1}$. The solution is then filtered through a filter with a porosity of 0.45 µm before injection.

The apparatus used is a Waters Alliance 2695 chromatographic line. The elution solvent is tetrahydrofuran, the flow rate is 0.2 ml·min$^{-1}$ and the temperature of the system is 35° C. A set of three identical columns in series is used (Shodex, length 300 mm, diameter 8 mm). The number of theoretical plates of the set of columns is greater than 22 000. The volume of the solution of the polymer sample injected is 50 µl. The detector is a Waters 2414 differential refractometer and the software for making use of the chromatographic data is the Waters Empower system.

The calculated molar masses are relative to a calibration curve produced for SBRs having the following microstructure: 25% by weight of units of styrene type, 23% by weight of units of 1,2-type and 50% by weight of units of trans-1,4-type.

Mooney Viscosity

For the polymers and rubber compositions, the Mooney viscosities $ML_{(1+4)}$100° C. are measured according to standard ASTM D-1646.

Use is made of an oscillating consistometer as described in standard ASTM D-1646. The Mooney plasticity measurement is carried out according to the following principle: the elastomer or the composition in the raw state (i.e., before curing) is moulded in a cylindrical chamber heated to 100° C. After preheating for one minute, the rotor rotates within the test specimen at 2 revolutions/minute and the working torque for maintaining this movement after rotating for 4 minutes is measured. The Mooney plasticity $ML_{(1+4)}$ is expressed in "Mooney unit" (MU, with 1 MU=0.83 N·m).

The difference between the Mooney viscosity of the composition and the Mooney viscosity of the elastomer makes it possible to measure the raw processability or processing. The smaller this difference, the better the raw processing.

Differential Calorimetry

The glass transition temperatures (Tg) of the elastomers are determined by means of a differential calorimeter (differential scanning calorimeter) according to standard ASTM E1356-08 (2014).

Near-Infrared (NIR) Spectroscopy

The microstructure of the elastomers is characterized by the near-infrared (NIR) spectroscopy technique.

Near-infrared spectroscopy (NIR) is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] performed using standard elastomers having a composition determined by $^{13}C$ NMR. The styrene content and the microstructure are then calculated from the NIR spectrum of an elastomer film having a thickness of approximately 730 µm. The spectrum is acquired in transmission mode between 4000 and 6200 cm$^{-1}$ with a resolution of 2 cm$^{-1}$ using a Bruker Tensor 37 Fourier-transform near-infrared spectrometer equipped with an InGaAs detector cooled by the Peltier effect.

Intrinsic Viscosity

The intrinsic viscosity of the elastomers at 25° C. is determined from a 0.1 g·dl$^{-1}$ solution of elastomer in toluene, according to the following principle:

The intrinsic viscosity is determined by the measurement of the flow time t of the polymer solution and of the flow time to of the toluene in a capillary tube.

The flow time of the toluene and the flow time of the 0.1 g·dl$^{-1}$ polymer solution are measured in an Ubbelohde tube (diameter of the capillary 0.46 mm, capacity from 18 to 22 ml) placed in a bath thermostatically controlled at 25±0.1° C.

The intrinsic viscosity is obtained by the following relationship:

$$\eta_{inh} = \frac{1}{C}\ln\left[\frac{(t)}{(t_O)}\right]$$

with:
C: concentration of the solution of polymer in toluene in g·dl$^{-1}$,
t: flow time of the solution of polymer in toluene in seconds,
$t_o$: flow time of the toluene in seconds,
$\eta_{Inh}$: intrinsic viscosity expressed in dl·g$^{-1}$.

Cold flow (CF$_{(1+6)}$100° C.)

This is a question of measuring the weight of elastomer extruded through a calibrated die over a given time (6 hours) and under fixed conditions (T=100° C.). The die has a diameter of 6.35 mm and a thickness of 0.5 mm and is located at the bottom and at the centre of a hollowed-out cylindrical dish with a diameter of 52 mm.

40±4 g of elastomer, formed beforehand into a pellet (thickness of 2 cm and diameter of 52 mm), are placed in this device. A calibrated piston weighing 1 kg (±5 g) is positioned on the elastomer pellet. The assembly is subsequently placed in an oven at 100° C.±0.5° C. As the conditions are not stabilized during the first hour in the oven, the product extruded at t=1 hour is cut off and then discarded.

The measurement is subsequently continued for 6 hours±5 min, during which the product is left in the oven. On conclusion of the 6 hours, the sample of product extruded is cut off and then weighed. The result of the measurement is the weight of elastomer weighed. The results are given in base 100 relative to the control. The lower the value, the more resistant the elastomer is to flow.

Determination of the Distribution of the Entities of a Modified Elastomer

The method employed is a modelling method already set out in Patent Application WO 2015/018599 A1 in the name of the Applicants and described below.

1—Example of the Determination of the Ratio of Kinetic Constants (K) of the Kinetic Model of Functionalization in a Batchwise Stirred Reactor Experimental Determination of the Percentage by Weight of the Chains Functionalized at the Chain End, of the Chains Functionalized in the Middle of the Chain and of the Star-Branched (3 Branches) Chains and of the Jump in Viscosity as a Function of the (3-N,N-Dimethylaminopropyl)Trimethoxysilane/n-BuLi Molar Ratio 91.6 ml (70.5 g) of methylcyclohexane, 14.8 ml (9.65 g) of butadiene and 0.49 ml of a 0.078 mol·l$^{-1}$ solution of tetrahydrofurfuryl ether in methylcyclohexane are introduced into eleven 250 ml glass bottles (Steinie bottles). After neutralization of the impurities in the solution to be polymerized by addition of n-butyllithium (n-BuLi), 1.90 ml of 0.097 mol·l$^{-1}$ n-BuLi in methylcyclohexane are added. The polymerization is carried out at 60° C.

After 15 minutes, the degree of conversion of monomer reaches 95%. This content is determined by weighing an extract dried at 140° C. under a reduced pressure of 200 mmHg. A control bottle (bottle no. 1) is stopped with an excess of methanol relative to the lithium. The "initial" intrinsic viscosity measured is 0.66 dl·g$^{-1}$. 0.88 ml of a 0.1 mol·l$^{-1}$ solution of (3-N,N-dimethylaminopropyl)trimethoxysilane in methylcyclohexane is added to the solutions of living polymer (0.48 molar eq. vs Li) present in bottles 2 to 9, 0.73 ml of this same solution is added to bottle 10 (0.40 molar eq. vs Li) and 1.83 ml of this same solution are added to bottle 11 (1.0 molar eq. vs Li). After reacting at 60° C. for 15 minutes, the solutions are antioxidized by addition of 0.4 part per hundred parts of elastomer (phr) of 4,4'-methylen-ebis(2,6-di(tert-butyl)phenol) and 0.2 part per hundred parts of elastomer (phr) of N-(1,3-dimethylbutyl)-N'-phenyl-p-phenylenediamine. The polymers thus treated are separated from their solution by drying at 60° C. under reduced pressure and a nitrogen stream for 12 hours.

The "final" intrinsic viscosities, the jumps in viscosity, defined as the ratios of the "final" intrinsic viscosities to the "initial" intrinsic viscosity, and also the percentages by weight of the deactivated chains (P), of the chains functionalized at the chain end (PA), of the chains functionalized in the middle of the chain (P$_2$A) and of the star-branched chains (P$_3$A) are presented in Table 1 below.

TABLE 1

Change in the distribution of the entities P + PA/P$_2$A/P$_3$A and in the jump in viscosity as a function of the (3-N,N-dimethylaminopropyl)trimethoxysilane/n-BuLi molar ratio

| Bottle | (3-N,N-Dimethylamino-propyl)trimethoxysilane/Li molar ratio | Jump in viscosity | P + PA/P$_2$A/P$_3$A (wt. %) |
|---|---|---|---|
| 2 | 0.48 | | 12/77/10 |
| 3 | 0.48 | | 13/77/9 |
| 4 | 0.48 | | 13/78/9 |
| 5 | 0.48 | | 13/82/5 |
| 6 | 0.48 | | 13/83/5 |
| 7 | 0.48 | | 13/83/4 |
| 8 | 0.48 | | 14/83/4 |
| 9 | 0.48 | 1.54 | 11/83/4 |
| 10 | 0.40 | 1.61 | 15/53/25 |
| 11 | 1.00 | 1.09 | 72/20/7 |

The living diene elastomer is functionalized according to the reaction mechanism:

| Reaction | Mechanism |
|---|---|
| R1 | PLi + A $\xrightarrow{k_1}$ PA |
| R2 | PLi + PA $\xrightarrow{k_2}$ P$_2$A |
| R3 | PLi + P$_2$A $\xrightarrow{k_3}$ P$_3$A | where
A represents the functionalization agent,
PLi represents a living elastomer chain,
PA represents the elastomer functionalized at the chain end,
P$_2$A represents the coupled elastomer,
P$_3$A represents the three-branched star-branched elastomer, and
$k_i$ represents the kinetic constant of the reaction R$_i$,
being carried out according to the following rate law:

| Reactions | Reaction rate |
|---|---|
| R1 | V$_1$ = k$_1$[PLi][A] |
| R2 | V$_2$ = k$_2$[PLi][PA] |
| R3 | V$_3$ = k$_3$[PLi][P$_2$A] | where
k$_1$, k$_2$ and k$_3$ are the kinetic constants respectively of the reactions R1, R2 and R3 (expressed in (m$^3$/mol)·s$^{-1}$),
[PLi] is the concentration of living chains (expressed in mol/m$^3$),
[A] is the concentration of modification agent A (expressed in mol/m$^3$),
[PA] is the concentration of elastomer functionalized at the chain end (expressed in mol/m$^3$),

[P₂A] is the concentration of coupled elastomer (expressed in mol/m³),
[P₃A] is the concentration of three-branched star-branched elastomer (expressed in mol/m³),
the ratio K of the kinetic constants defined as:

$$K = \frac{k_1}{k_2} = \frac{k_2}{k_3}$$

being greater than 1.

The kinetic model for functionalization incorporated, according to a person skilled in the art, in a perfectly stirred batchwise reactor model (bibliography: Villermeaux, J; Génie de la réaction chimique; 1993) makes it possible to determine the distribution of the different entities. Furthermore, the chains may be deactivated (P) during the polymerization and/or functionalization step. Thus, the final product is a mixture of deactivated elastomer (P), elastomer functionalized at the chain end (PA), elastomer functionalized in the middle of the chain (P₂A) and star-branched elastomer (P₃A).

For the experimental points of Table 1 above, the value of $K=10^{2\pm1}$ was estimated according to the description of the perfectly stirred batchwise reactor model, which represents the reactor used for these experiments.

The distribution of the entities P, PA, P₂A and P₃A as a function of the functionalization agent/living polymer chains (PLi) molar ratio is represented in FIG. 1: simulated (lines) and measured (points).

2—Example of the Determination of the Kinetics of Functionalization in a Batchwise Stirred Reactor Experimental Determination of the Percentage by Weight of the Chains Functionalized at the Chain End, of the Chains Functionalized in the Middle of the Chain and of the Star-Branched (3 Branches) Chains as a Function of the Coupling Time with (3-N,N-Dimethylaminopropyl) Trimethoxysilane (~0.5 Mol Eq. Vs Li)

91.6 ml (70.5 g) of methylcyclohexane, 14.8 ml (9.65 g) of butadiene and 0.49 ml of a 0.078 mol·l⁻¹ solution of tetrahydrofurfuryl ether in methylcyclohexane are introduced into twenty-two 250 ml glass bottles (Steinie bottles). After neutralization of the impurities in the solution to be polymerized by addition of n-butyllithium (n-BuLi), 1.90 ml of 0.097 mol·l⁻¹ n-BuLi in methylcyclohexane are added. The polymerization is carried out at 60° C.

After 15 minutes, the degree of conversion of monomer reaches 95%. This content is determined by weighing an extract dried at 140° C. under a reduced pressure of 200 mmHg. 0.88 ml of a 0.1 mol·l⁻¹ solution of (3-N,N-dimethylaminopropyl)trimethoxysilane in methylcyclohexane are added to the living polymer solutions (0.48 molar eq. vs Li) present in the remaining twenty-one bottles. After reacting at 60° C. for 10 seconds (bottles 12, 13 and 14), 15 seconds (bottles 15, 16 and 17), 20 seconds (bottles 18, 19 and 20), 30 seconds (bottles 21 and 22), 2 minutes (bottle 23) and 15 minutes (bottles 24, 25, 26, 27, 28, 29, 30, 31 and 32), the solutions are antioxidized by addition of 0.4 part per hundred parts of elastomer (phr) of 4,4'-methylenebis(2,6-di (tert-butyl)phenol) and 0.2 part per hundred parts of elastomer (phr) of N-(1,3-dimethylbutyl)-N'-phenyl-p-phenylenediamine. The polymers thus treated are separated from their solution by drying at 60° C. under reduced pressure and a nitrogen stream for 12 hours.

The percentages by weight of the deactivated chains (P), of the chains functionalized at the chain end (PA), of the chains functionalized in the middle of the chain (P₂A) and of the star-branched chains (P₃A) are presented in Table 2 below.

TABLE 2

Change in the distribution of the entities P + PA/P₂A/P₃A as a function of the reaction time with (3-N,N-dimethylaminopropyl)trimethoxysilane

| Bottle | Reaction time with (3-N,N-dimethylamino-propyl)trimethoxysilane | P + PA (wt. %) | P₂A (wt. %) | P₃A (wt. %) |
|---|---|---|---|---|
| 12 | 10 s | 23 | 76 | 1 |
| 13 | 10 s | 23 | 76 | 1 |
| 14 | 10 s | 22 | 77 | 1 |
| 15 | 15 s | 19 | 79 | 1 |
| 16 | 15 s | 20 | 79 | 1 |
| 17 | 15 s | 19 | 79 | 1 |
| 18 | 20 s | 18 | 81 | 1 |
| 19 | 20 s | 17 | 81 | 1 |
| 20 | 20 s | 18 | 81 | 1 |
| 21 | 30 s | 16 | 82 | 2 |
| 22 | 30 s | 14 | 83 | 2 |
| 23 | 2 min | 11 | 86 | 2 |
| 24 | 15 min | 12 | 77 | 10 |
| 25 | 15 min | 13 | 77 | 9 |
| 26 | 15 min | 13 | 78 | 9 |
| 27 | 15 min | 13 | 82 | 5 |
| 28 | 15 min | 13 | 83 | 4 |
| 29 | 15 min | 13 | 83 | 4 |
| 30 | 15 min | 14 | 83 | 4 |
| 31 | 15 min | 11 | 84 | 4 |
| 32 | 15 min | 9 | 88 | 3 |

Figure 2:
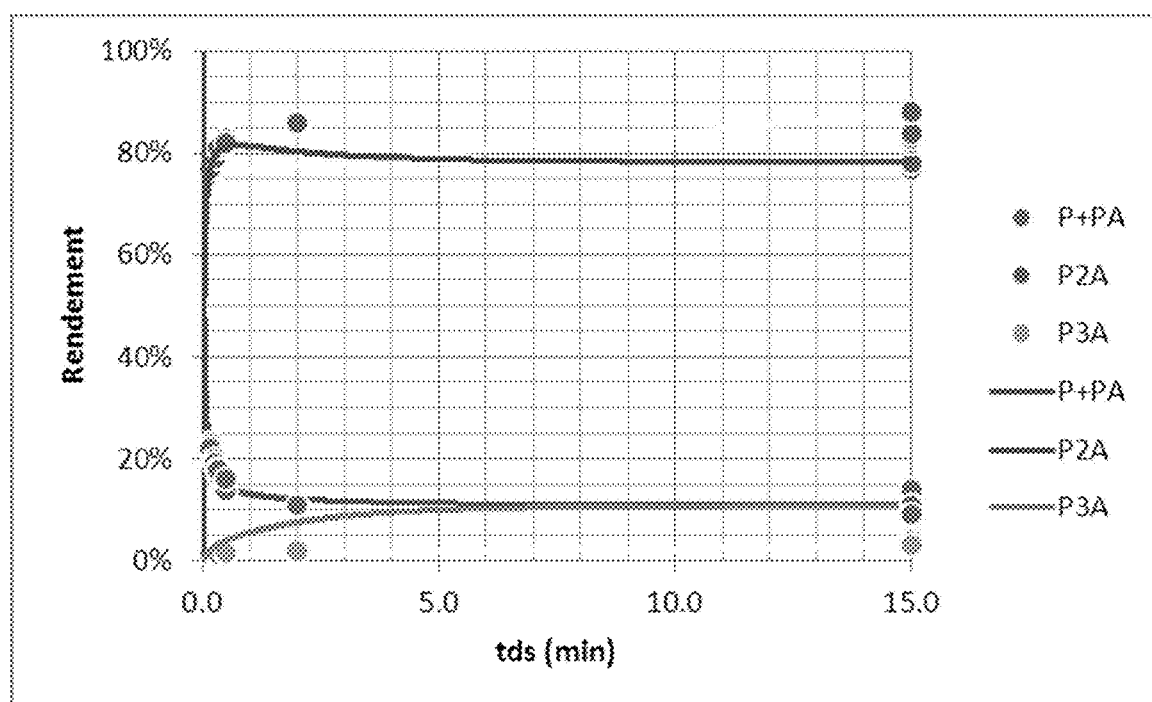
FIG. 2 is a graph illustrating simulated yields compared to measured yields as a function of reaction time in a perfectly stirred batchwise reactor according to an example embodiment.

By using the same kinetic model as the preceding example and the value of $K=10^{2\pm1}$, the value of $k_1[PLi]$, in the kinetic model, is estimated at $10^{4\pm0.2}$. The simulated yields are compared with the measured yields as a function of the reaction time in a perfectly stirred batchwise reactor in FIG. 2.

3—Example of the Determination of the Ratio of Kinetic Constants (K) of Functionalization in Continuous Configuration A variable amount of functionalization agent is injected into a pilot-scale continuous polymerization plant, at the outlet of the continuous stirred polymerization reactor, assumed to be perfectly stirred, in order to characterize the section of continuous functionalization. The functionalization section is composed of a static mixer of Kenics type comprising 36 4-litre elements and of a continuous stirred reactor with a volume of 32.5 l, assumed to be perfectly stirred. The minimum residence time in the stirred reactors is 20 minutes.

Methylcyclohexane, butadiene, styrene and tetrahydrofurfuryl ethyl ether are continuously introduced according to the following proportions: butadiene flow rate by weight=2.85 kg·h⁻¹, styrene flow rate by weight=1.25 kg·h⁻¹, concentration by weight of monomer=11 wt. %, 60 ppm of tetrahydrofurfuryl ethyl ether, into a 32.5-litre continuous stirred reactor, assumed to be perfectly stirred according to those skilled in the art. n-Butyllithium (n-BuLi) is introduced in a sufficient amount in order to neutralize the protic impurities introduced by the different constituents present in the line inlet. 850 µmol of n-BuLi per 100 g of monomers are introduced at the inlet of the reactor.

The different flow rates are calculated in order for the mean residence time in the reactor to be 40 min. The temperature is maintained at 90° C.

The degree of conversion, measured on a sample withdrawn at the reactor outlet, is 92.6%.

At the outlet of the polymerization reactor, (3-N,N-dimethylaminopropyl)trimethoxysilane in solution in methylcyclohexane is added to the living polymer solution in different amounts (different (3-N,N-dimethylaminopropyl)trimethoxysilane/PLi molar ratios) in order to characterize the functionalization process. This solution is mixed in a static mixer composed of 36 mixing elements of Kenics KMR type and then passes through an empty pipe, the total residence time in the pipe being 3 minutes (static mixer+empty pipe), and a 32.5-litre continuous stirred reactor, assumed to be perfectly stirred according to those skilled in the art, with a residence time of 40 minutes. The polymers are subsequently subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymers thus treated are separated from their solution by a steam stripping operation and then dried on an open mill at 100° C.

Figure 3:
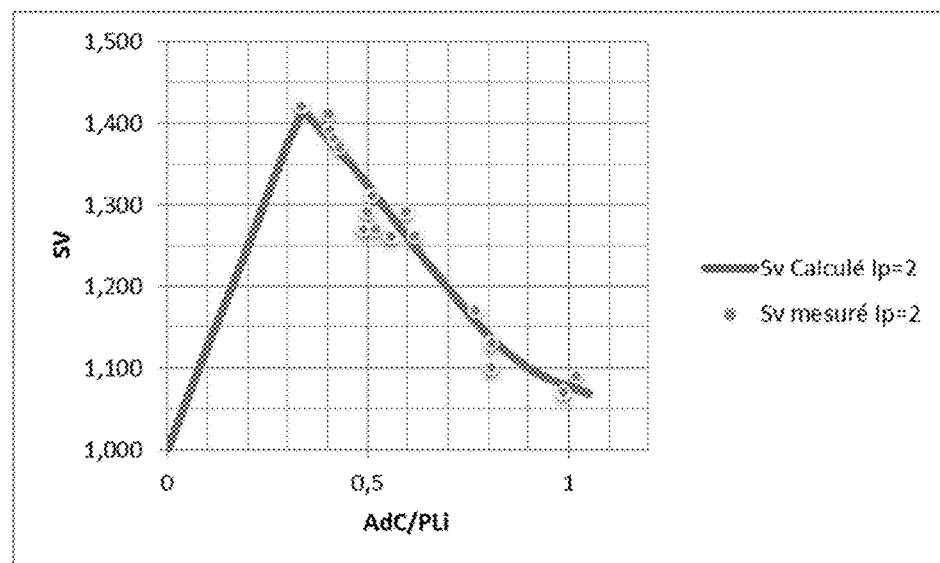
FIG. 3 a graph illustrating jumps in intrinsic viscosity (VJ) as a function of a coupling and star branching agent (CA)/living polymer chains (PLi) according to an example embodiment.

The jumps in intrinsic viscosity (VJ) measured are presented in FIG. 3.

The kinetic model of functionalization described above is incorporated, according to those skilled in the art, in a model of tubular reactor (representative of the Kenics static mixer), followed by a perfectly stirred continuous reactor (representative of the stirred functionalization reactor) (bibliography: Villermeaux, J; Génie de la réaction chimique; 1993) and makes it possible to determine the distribution of PLi, P, PA, P$_2$A and P$_3$A entities.

In order to make the connection between the distribution of the entities PLi, P, PA, P$_2$A and P$_3$A which is calculated by the kinetic model of functionalization and the experimental ratio of intrinsic viscosities before and after functionalization (VJ), the VJ is calculated theoretically by the equation below:

$$SV = \left( \frac{\sum_{i=1}^{n} w_{P_iA} \overline{M}_{w,P_i A}^a g_i'}{\overline{M}_{w,P}^a} \right)$$

where:
$wP_iA$ is the fraction by weight of the entities $P_iA$, PLi and P;
$M_w$ is the weight-average molecular weight;
a is the parameter of the MHS (Mark-Houwink-Sakurada) equation and is equal to 0.75;
$g_i'$ is a correction for the star-branched polymers, for example:

$$g_i' = \left( \frac{3i-2}{i^2} \right)^b$$

where:
b is equal to 0.58 (work: Structure and Rheology of Molten Polymers).

By assuming that the residence time is long enough to be regarded as infinite, the ratio of kinetic constants K is estimated by minimizing the differences in experimental and calculated VJ. The value of K is $10^{1\pm1}$, as represented in FIG. 3.

Figure 4:
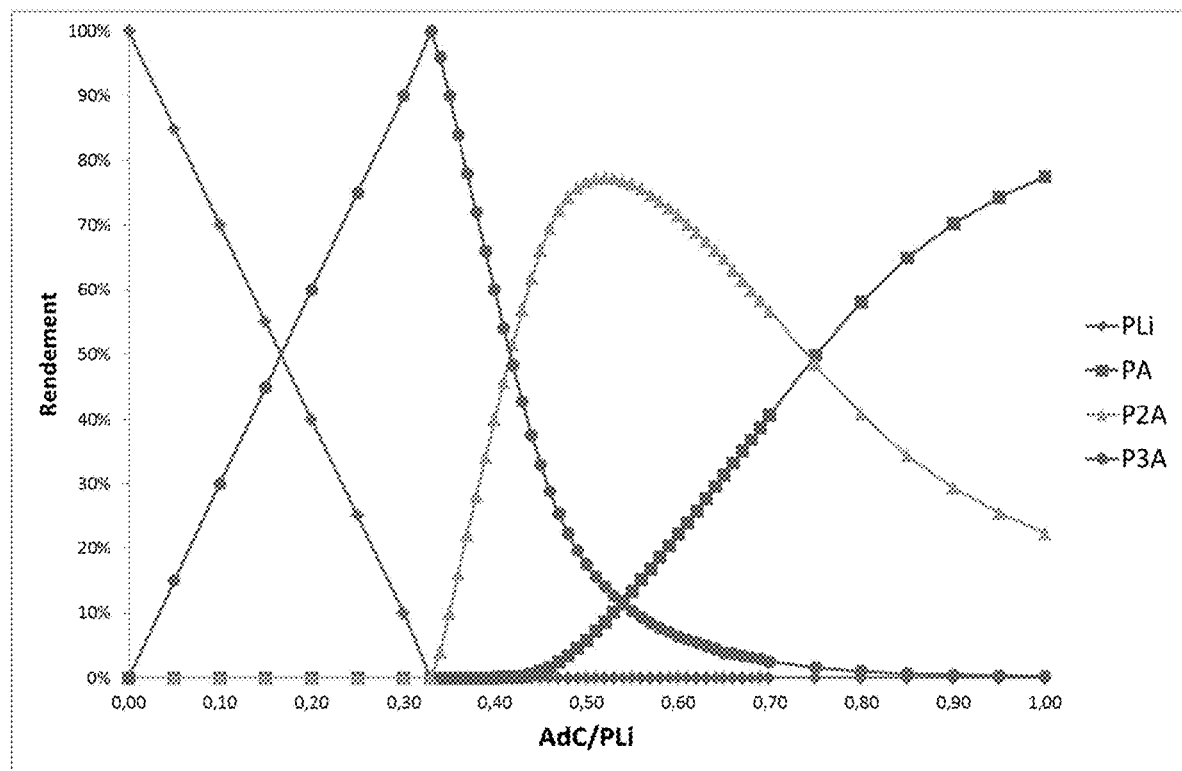
FIG. 4 a graph illustrating yield as a function of a coupleing and star branching agent(CA)/living polumer chains (PLi) according to an example embodiment.

The calculated VJ is determined from the distribution of entities which is calculated by the kinetic model incorporated in the models of tubular and perfectly stirred continuous reactors (FIG. 4).

Dynamic Properties:

The dynamic properties and in particular tan δ max are measured on a viscosity analyser (Metravib VA4000) according to Standard ASTM D 5992-96. The response of a sample of vulcanized composition (cylindrical test specimen with a thickness of 2 mm and a cross section of 79 mm$^2$), subjected to a simple alternating sinusoidal shear stress, at a frequency of 10 Hz, under standard temperature conditions (23° C.) according to Standard ASTM D 1349-99, is recorded. A strain amplitude sweep is carried out from 0.1% to 50% peak-to-peak (outward cycle) and then from 50% to 0.1% peak-to-peak (return cycle). The result more particularly made use of is the loss factor tan δ. For the return cycle, the maximum value of tan δ observed, denoted tan δ max, is indicated. This value is representative of the hysteresis of the material and in the present case of the rolling resistance: the smaller the value of tan δ max, the lower the rolling resistance. In the examples, the results of the dynamic properties are given in base 100. The higher this number, the higher the hysteresis. A difference of 2 points between two values is considered to be significant.

Abrasion

The measurement of the loss of mass by abrasion is performed according to the indications of standard NF ISO 4659, using a Zwick abrasimeter in which the cylindrical specimen is subjected to the action of an abrasive gauze of P60 grains attached to the surface of a rotating drum under a contact pressure of 10 N and over a course of 40 m. The value measured is a volume of loss of substance (in mm$^3$) after abrasion wear; the smaller the value, the better the abrasion resistance. The results are given in base 100 relative to the control. In the present case, this value is representative of the wear resistance of a tire comprising such a material in its tread; the smaller the value, the better the abrasion resistance of the material and therefore also the better the wear resistance of a tire comprising this material in its tread.

Examples of Elastomer Preparation

Preparation of the Polymer A: SBR Aminoalkoxysilane-Functional in the Middle of the Chain—According to the Invention Tg −88° C.

Methylcyclohexane, butadiene, styrene and tetrahydrofurfuryl ethyl ether are continuously introduced according to the following proportions: butadiene flow rate by weight=4.013 kg·h-1, styrene flow rate by weight=0.122 kg·h-1, concentration by weight of monomer=9.75 wt. %, 15 ppm of tetrahydrofurfuryl ethyl ether, into a stirred continuously fed 32 l reactor, assumed to be perfectly stirred according to those skilled in the art. n-Butyllithium (n-BuLi) is introduced in a sufficient amount in order to neutralize the protic impurities introduced by the different constituents present in the inlet of the first reactor. 850 µmol of n-BuLi per 100 g of monomer are introduced at the inlet of the reactor.

The different flow rates are calculated in order for the mean residence time in the reactor to be 35 min. The temperature is maintained at 95° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 1.98 dl·g$^{-1}$. The number-average molar mass Mn, determined by the SEC technique, is 90 000 g·mol$^{-1}$ and the polydispersity index PI is 1.90.

At the outlet of the polymerization reactor, 440 μmol per 100 g of monomer of (3-N,N-dimethylaminopropyl) trimethoxysilane (coupling and star-branching agent CA) in solution in methylcyclohexane are added to the solution of living polymer (CA/Li=0.52).

This solution is mixed for 30 seconds in a piston-type system consisting of a static mixer consisting of 36 mixing elements of Kenics KMR type then an empty pipe. The solution is subsequently mixed for 35 minutes in a reactor assumed to be perfectly stirred, the temperature in these reactors (piston-type system+mixer assumed to be perfectly stirred) being 95° C.

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.52 dl·g$^{-1}$. The jump in viscosity, defined as the ratio of said "final" viscosity to said "initial" viscosity, is in this instance 1.27.

The Mooney viscosity of this polymer A is 70.

The number-average molar mass Mn, determined by the SEC technique, is 168 600 g·mol$^{-1}$ and the polydispersity index PI is 1.68.

The microstructure of this polymer is determined by the NIR method. The content of 1,2-units is 12.7% relative to the butadiene units. The content by weight of styrene is 2.1%.

The glass transition temperature of this polymer is −88° C.

The distribution of the entities after functionalization is given with the modelling method described above: 86% of functional chains, 77% of which are functional in the middle of the chain, and 14% of star-branched chains.

Preparation of the Polymer B: BR Aminoalkoxysilane-Functional in the Middle of the Chain—According to the Invention Tg −91° C.

Methylcyclohexane, butadiene and tetrahydrofurfuryl ethyl ether are continuously introduced according to the following proportions: butadiene flow rate by weight=4.135 kg·h$^{-1}$ concentration by weight of monomer=9.75 wt. %, 15 ppm of tetrahydrofurfuryl ethyl ether, into a stirred continuously fed 32 l reactor, assumed to be perfectly stirred according to those skilled in the art. n-Butyllithium (n-BuLi) is introduced in a sufficient amount in order to neutralize the protic impurities introduced by the different constituents present in the inlet of the first reactor. 850 μmol of n-BuLi per 100 g of monomer are introduced at the inlet of the reactor.

The different flow rates are calculated in order for the mean residence time in the reactor to be 35 min. The temperature is maintained at 95° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 1.97 dl·g$^{-1}$. The number-average molar mass Mn, determined by the SEC technique, is 88 000 g·mol$^{-1}$ and the polydispersity index PI is 1.90.

At the outlet of the polymerization reactor, 442 μmol per 100 g of monomer of (3-N,N-dimethylaminopropyl) trimethoxysilane (coupling and star-branching agent CA) in solution in methylcyclohexane are added to the solution of living polymer (CA/Li=0.52).

This solution is mixed for 30 seconds in a piston-type system consisting of a static mixer consisting of 36 mixing elements of Kenics KMR type then an empty pipe. The solution is subsequently mixed for 35 minutes in a reactor assumed to be perfectly stirred, the temperature in these reactors (piston-type system+mixer assumed to be perfectly stirred) being 95° C.

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.54 dl·g$^{-1}$. The jump in viscosity, defined as the ratio of said "final" viscosity to said "initial" viscosity, is in this instance 1.27.

The Mooney viscosity of this polymer B is 69.

The number-average molar mass Mn, determined by the SEC technique, is 170 000 g·mol$^{-1}$ and the polydispersity index PI is 1.70.

The microstructure of this polymer is determined by the NIR method. The content of 1,2-units is 12.5% relative to the butadiene units.

The glass transition temperature of this polymer is −91° C.

The distribution of the entities after functionalization is given with the modelling method described above: 86% of functional chains, 77% of which are functional in the middle of the chain, and 14% of star-branched chains.

Preparation of the Polymer C: SBR Aminoalkoxysilane-Functional in the Middle of the Chain—Comparative Tg −49° C.

Methylcyclohexane, butadiene, styrene and tetrahydrofurfuryl ethyl ether are continuously introduced according to the following proportions: butadiene flow rate by weight=2.874 kg·h-1, styrene flow rate by weight=1.204 kg·h-1, concentration by weight of monomer=11 wt. %, 60 ppm of tetrahydrofurfuryl ethyl ether, into a stirred continuously fed 32 l reactor, assumed to be perfectly stirred according to those skilled in the art. n-Butyllithium (n-BuLi) is introduced in a sufficient amount in order to neutralize the protic impurities introduced by the different constituents present in the inlet of the first reactor. 870 μmol of n-BuLi per 100 g of monomer are introduced at the inlet of the reactor.

The different flow rates are calculated in order for the mean residence time in the reactor to be 40 min. The temperature is maintained at 90° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 1.66 dl·g$^{-1}$. The number-average molar mass Mn, determined by the SEC technique, is 94 000 g·mol$^{-1}$ and the polydispersity index PI is 1.90.

At the outlet of the polymerization reactor, 452 μmol per 100 g of monomer of (3-N,N-dimethylaminopropyl)

trimethoxysilane (coupling and star-branching agent CA) in solution in methylcyclohexane are added to the solution of living polymer (CA/Li=0.52).

This solution is mixed for 30 seconds in a piston-type system consisting of a static mixer consisting of 36 mixing elements of Kenics KMR type then an empty pipe. The solution is subsequently mixed for 35 minutes in a reactor assumed to be perfectly stirred, the temperature in these reactors (piston-type system+mixer assumed to be perfectly stirred) being 95° C.

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.1 dl·g$^{-1}$. The jump in viscosity, defined as the ratio of said "final" viscosity to said "initial" viscosity, is in this instance 1.30.

The Mooney viscosity of this polymer C is 67.

The number-average molar mass Mn, determined by the SEC technique, is 141 200 g·mol$^{-1}$ and the polydispersity index PI is 1.8.

The microstructure of this polymer is determined by the NIR method. The content of 1,2-units is 24.2% relative to the butadiene units. The content by weight of styrene is 26.4%.

The glass transition temperature of this polymer is −49° C.

The distribution of the entities after functionalization is given with the modelling method described above: 86% of functional chains, 77% of which are functional in the middle of the chain, and 14% of star-branched chains.

Preparation of the Polymer D: SBR Aminoalkoxysilane-Functional in the Middle of the Chain—Comparative Tg −88° C.

Methylcyclohexane, butadiene, styrene and tetrahydrofurfuryl ethyl ether are continuously introduced according to the following proportions: butadiene flow rate by weight=4.013 kg·h-1, styrene flow rate by weight=0.122 kg·h-1, concentration by weight of monomer=9.75 wt. %, 15 ppm of tetrahydrofurfuryl ethyl ether, into a stirred continuously fed 32 l reactor, assumed to be perfectly stirred according to those skilled in the art. n-Butyllithium (n-BuLi) is introduced in a sufficient amount in order to neutralize the protic impurities introduced by the different constituents present in the inlet of the first reactor. 850 µmol of n-BuLi per 100 g of monomer are introduced at the inlet of the reactor.

The different flow rates are calculated in order for the mean residence time in the reactor to be 35 min. The temperature is maintained at 95° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 1.98 dl·g$^{-1}$. The number-average molar mass Mn, determined by the SEC technique, is 90 000 g·mol$^{-1}$ and the polydispersity index PI is 1.90.

At the outlet of the polymerization reactor, 380 µmol per 100 g of monomer of (3-N,N-dimethylaminopropyl) trimethoxysilane (coupling and star-branching agent CA) in solution in methylcyclohexane are added to the solution of living polymer (CA/Li=0.45).

This solution is mixed for 30 seconds in a piston-type system consisting of a static mixer consisting of 36 mixing elements of Kenics KMR type then an empty pipe. The solution is subsequently mixed for 35 minutes in a reactor assumed to be perfectly stirred, the temperature in these reactors (piston-type system+mixer assumed to be perfectly stirred) being 95° C.

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.67 dl·g$^{-1}$. The jump in viscosity, defined as the ratio of said "final" viscosity to said "initial" viscosity, is in this instance 1.35.

The Mooney viscosity of this polymer D is 77.

The number-average molar mass Mn, determined by the SEC technique, is 165 000 g·mol$^{-1}$ and the polydispersity index PI is 1.70.

The microstructure of this polymer is determined by the NIR method. The content of 1,2-units is 12.7% relative to the butadiene units. The content by weight of styrene is 2.1%.

The glass transition temperature of this polymer is −88° C.

The distribution of the entities after functionalization is given with the modelling method described above: 67% of functional chains in the middle of the chain, and 33% of star-branched chains.

Preparation of the Polymer E: SBR Aminoalkoxysilane-Functional in the Middle of the Chain—According to the Invention Tg −88° C.

Methylcyclohexane, butadiene, styrene and tetrahydrofurfuryl ethyl ether are continuously introduced according to the following proportions: butadiene flow rate by weight=4.013 kg·h-1, styrene flow rate by weight=0.122 kg·h-1, concentration by weight of monomer=9.75 wt. %, 15 ppm of tetrahydrofurfuryl ethyl ether, into a stirred continuously fed 32 l reactor, assumed to be perfectly stirred according to those skilled in the art. n-Butyllithium (n-BuLi) is introduced in a sufficient amount in order to neutralize the protic impurities introduced by the different constituents present in the inlet of the first reactor. 850 µmol of n-BuLi per 100 g of monomer are introduced at the inlet of the reactor.

The different flow rates are calculated in order for the mean residence time in the reactor to be 35 min. The temperature is maintained at 95° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 1.98 dl·g$^{-1}$. The number-average molar mass Mn, determined by the SEC technique, is 90 000 g·mol$^{-1}$ and the polydispersity index PI is 1.90.

At the outlet of the polymerization reactor, 425 µmol per 100 g of monomer of (3-N,N-dimethylaminopropyl) trimethoxysilane (coupling and star-branching agent CA) in solution in methylcyclohexane are added to the solution of living polymer (CA/Li=0.50).

This solution is mixed for 30 seconds in a piston-type system consisting of a static mixer consisting of 36 mixing elements of Kenics KMR type then an empty pipe. The solution is subsequently mixed for 35 minutes in a reactor assumed to be perfectly stirred, the temperature in these reactors (piston-type system+mixer assumed to be perfectly stirred) being 95° C.

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.54 dl·g$^{-1}$. The jump in viscosity, defined as the ratio of said "final" viscosity to said "initial" viscosity, is in this instance 1.30.

The Mooney viscosity of this polymer E is 71.

The number-average molar mass Mn, determined by the SEC technique, is 165 000 g·mol$^{-1}$ and the polydispersity index PI is 1.70.

The microstructure of this polymer is determined by the NIR method. The content of 1,2-units is 12.7% relative to the butadiene units. The content by weight of styrene is 2.1%.

The glass transition temperature of this polymer is −88° C.

The distribution of the entities after functionalization is given with the modelling method described above: 83% of functional chains, 76% of which are functional in the middle of the chain, and 18% of star-branched chains.

Preparation of the Polymer F: SBR Epoxide+Alkoxysilane-Functional in the Middle of the Chain—According to the Invention Tg −88° C.

Methylcyclohexane, butadiene, styrene and tetrahydrofurfuryl ethyl ether are continuously introduced according to the following proportions: butadiene flow rate by weight=4.013 kg·h-1, styrene flow rate by weight=0.122 kg·h-1, concentration by weight of monomer=9.75 wt. %, 15 ppm of tetrahydrofurfuryl ethyl ether, into a stirred continuously fed 32 l reactor, assumed to be perfectly stirred according to those skilled in the art. n-Butyllithium (n-BuLi) is introduced in a sufficient amount in order to neutralize the protic impurities introduced by the different constituents present in the inlet of the first reactor. 850 µmol of n-BuLi per 100 g of monomer are introduced at the inlet of the reactor.

The different flow rates are calculated in order for the mean residence time in the reactor to be 35 min. The temperature is maintained at 95° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 1.95 dl·g$^{-1}$. The number-average molar mass Mn, determined by the SEC technique, is 88 000 g·mol$^{-1}$ and the polydispersity index PI is 1.89.

At the outlet of the polymerization reactor, 440 µmol per 100 g of monomer of (3-glycidyloxypropyl)trimethoxysilane (coupling and star-branching agent CA) in solution in methylcyclohexane are added to the solution of living polymer (CA/Li=0.52).

This solution is mixed for 30 seconds in a piston-type system consisting of a static mixer consisting of 36 mixing elements of Kenics KMR type then an empty pipe. The solution is subsequently mixed for 35 minutes in a reactor assumed to be perfectly stirred, the temperature in these reactors (piston-type system+mixer assumed to be perfectly stirred) being 95° C.

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.50 dl·g$^{-1}$. The jump in viscosity, defined as the ratio of said "final" viscosity to said "initial" viscosity, is in this instance 1.28.

The Mooney viscosity of this polymer F is 71.

The number-average molar mass Mn, determined by the SEC technique, is 170 200 g·mol$^{-1}$ and the polydispersity index PI is 1.66.

The microstructure of this polymer is determined by the NIR method. The content of 1,2-units is 12.7% relative to the butadiene units. The content by weight of styrene is 2.1%.

The glass transition temperature of this polymer is −88° C.

The distribution of the entities after functionalization is given with the modelling method described above: 83% of functional chains, 79% of which are functional in the middle of the chain, and 17% of star-branched chains.

Preparation of the Polymer G: BR Epoxide+Alkoxysilane-Functional in the Middle of the Chain—According to the Invention Tg −91° C.

Methylcyclohexane, butadiene and tetrahydrofurfuryl ethyl ether are continuously introduced according to the following proportions: butadiene flow rate by weight=4.135 kg·h$^{-1}$, concentration by weight of monomer=9.75 wt. %, 15 ppm of tetrahydrofurfuryl ethyl ether, into a stirred continuously fed 32 l reactor, assumed to be perfectly stirred according to those skilled in the art. n-Butyllithium (n-BuLi) is introduced in a sufficient amount in order to neutralize the protic impurities introduced by the different constituents present in the inlet of the first reactor. 850 µmol of n-BuLi per 100 g of monomer are introduced at the inlet of the reactor.

The different flow rates are calculated in order for the mean residence time in the reactor to be 35 min. The temperature is maintained at 95° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 1.99 dl·g$^{-1}$. The number-average molar mass Mn, determined by the SEC technique, is 90 000 g·mol$^{-1}$ and the polydispersity index PI is 1.91.

At the outlet of the polymerization reactor, 440 µmol per 100 g of monomer of (3-glycidyloxypropyl)trimethoxysilane (coupling and star-branching agent CA) in solution in methylcyclohexane are added to the solution of living polymer (CA/Li=0.52).

This solution is mixed for 30 seconds in a piston-type system consisting of a static mixer consisting of 36 mixing elements of Kenics KMR type then an empty pipe. The solution is subsequently mixed for 35 minutes in a reactor assumed to be perfectly stirred, the temperature in these reactors (piston-type system+mixer assumed to be perfectly stirred) being 95° C.

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.55 dl·g$^{-1}$. The jump in viscosity, defined as the ratio of said "final" viscosity to said "initial" viscosity, is in this instance 1.28.

The Mooney viscosity of this polymer G is 70.

The number-average molar mass Mn, determined by the SEC technique, is 173 000 g·mol$^{-1}$ and the polydispersity index PI is 1.71.

The microstructure of this polymer is determined by the NIR method. The content of 1,2-units is 12.5% relative to the butadiene units.

The glass transition temperature of this polymer is −91° C.

The distribution of the entities after functionalization is given with the modelling method described above: 85% of functional chains, 76% of which are functional in the middle of the chain, and 15% of star-branched chains.

Preparation of the Polymer H: SBR Epoxide+Alkoxysilane-Functional in the Middle of the Chain—Comparative Tg −48° C.

Methylcyclohexane, butadiene, styrene and tetrahydrofurfuryl ethyl ether are continuously introduced according to the following proportions: butadiene flow rate by weight=2.874 kg·h-1, styrene flow rate by weight=1.204 kg·h-1, concentration by weight of monomer=11 wt. %, 60 ppm of tetrahydrofurfuryl ethyl ether, into a stirred continuously fed 32 l reactor, assumed to be perfectly stirred according to those skilled in the art. n-Butyllithium (n-BuLi) is introduced in a sufficient amount in order to neutralize the protic impurities introduced by the different constituents present in the inlet of the first reactor. 870 μmol of n-BuLi per 100 g of monomer are introduced at the inlet of the reactor.

The different flow rates are calculated in order for the mean residence time in the reactor to be 40 min. The temperature is maintained at 90° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 1.65 dl·g$^{-1}$. The number-average molar mass Mn, determined by the SEC technique, is 92 000 g·mol$^{-1}$ and the polydispersity index PI is 1.90.

At the outlet of the polymerization reactor, 450 μmol per 100 g of monomer of (3-glycidyloxypropyl)trimethoxysilane (coupling and star-branching agent CA) in solution in methylcyclohexane are added to the solution of living polymer (CA/Li=0.52).

This solution is mixed for 30 seconds in a piston-type system consisting of a static mixer consisting of 36 mixing elements of Kenics KMR type then an empty pipe. The solution is subsequently mixed for 35 minutes in a reactor assumed to be perfectly stirred, the temperature in these reactors (piston-type system+mixer assumed to be perfectly stirred) being 95° C.

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 2.14 dl·g$^{-1}$. The jump in viscosity, defined as the ratio of said "final" viscosity to said "initial" viscosity, is in this instance 1.30.

The Mooney viscosity of this polymer H is 68.

The number-average molar mass Mn, determined by the SEC technique, is 143 000 g·mol$^{-1}$ and the polydispersity index PI is 1.75.

The microstructure of this polymer is determined by the NIR method. The content of 1,2-units is 24.0% relative to the butadiene units. The content by weight of styrene is 27.0%.

The glass transition temperature of this polymer is −48° C.

The distribution of the entities after functionalization is given with the modelling method described above: 85% of functional chains, 77% of which are functional in the middle of the chain, and 15% of star-branched chains.

Preparation of the Polymer I: BR Mercaptoalkoxysilane-Functional in the Middle of the Chain—According to the Invention Tg −91° C.

7.5 kg of butadiene and also 313 ml of a 0.349 mol·l$^{-1}$ solution of tetrahydrofuran in methylcyclohexane, are injected into a 90-litre reactor, maintained under a nitrogen pressure of approximately 2 bar, containing 43.9 kg of methylcyclohexane. After neutralization of the impurities in the solution to be polymerized by addition of n-butyllithium, 1043 ml of 0.063 mol·l$^{-1}$ n-butyllithium in methylcyclohexane are added. The polymerization is carried out at 50° C.

After 95 minutes, the degree of conversion of the monomers reaches 89%. This content is determined by weighing an extract dried at 140° C. under a reduced pressure of 200 mmHg. 528 ml of a 0.020 mol·l$^{-1}$ solution of 3,3-methoxy-8,8,9,9-tetramethyl-2-oxa-7-thia-3,8-disiladecane in methylcyclohexane are added to the solution of living polymer. After reacting at 50° C. for 30 minutes, 528 ml of a 0.030 mol·l$^{-1}$ solution of 3,3-methoxy-8,8,9,9-tetramethyl-2-oxa-7-thia-3,8-disiladecane in methylcyclohexane are subsequently added to this polymer solution. After reacting at 50° C. for 30 minutes, the solution is antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on an open mill at 100° C.

The microstructure of this copolymer is determined by the NIR method: the content by weight of 1,4-trans units is 49%, that of 1,4-cis units is 37% and that of 1,2-units is 14%.

The glass transition temperature of this copolymer is −91° C.

The Mooney viscosity of the polymer E is 42.

The distribution of the entities after functionalization is given by the high-resolution SEC method: 70% of functional chains in the middle of the chain, 16% of non-functional chains and 14% of star-branched chains.

Preparation of the Polymer J: SBR Mercaptoalkoxysilane-Functional in the Middle of the Chain—Comparative Tg −48° C.

3.0 kg of styrene and 4.7 kg of butadiene, and also 660 ml of a 0.59 mol·l$^{-1}$ solution of tetrahydrofuran in methylcyclohexane are injected into a 90-litre reactor, maintained under a nitrogen pressure of approximately 2 bar, containing 44.3 kg of methylcyclohexane. After neutralization of the impurities in the solution to be polymerized by addition of n-butyllithium, 825 ml of 0.063 mol·l$^{-1}$ n-butyllithium in methylcyclohexane are added. The polymerization is carried out at 50° C.

After 45 minutes, the degree of conversion of the monomers reaches 69%. This content is determined by weighing an extract dried at 140° C. under a reduced pressure of 200 mmHg. 412 ml of a 0.020 mol·l$^{-1}$ solution of 3,3-methoxy-8,8,9,9-tetramethyl-2-oxa-7-thia-3,8-disiladecane in methylcyclohexane are added to the solution of living polymer. After reacting at 50° C. for 30 minutes, 412 ml of a 0.030 mol·l$^{-1}$ solution of 3,3-methoxy-8,8,9,9-tetramethyl-2-oxa-7-thia-3,8-disiladecane in methylcyclohexane are subsequently added to this polymer solution. After reacting at 50° C. for 30 minutes, the solution is antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on an open mill at 100° C.

The microstructure of this copolymer is determined by the NIR method: the content by weight of 1,4-trans units is 48%, that of 1,4-cis units is 28% and that of 1,2-units is 24%, each of these three contents being relative to the butadiene units. The content by weight of styrene is 27.5%.

The glass transition temperature of this copolymer is −48° C.

The Mooney viscosity of the polymer J is 66.

The distribution of the entities after functionalization is given by the high-resolution SEC method: 70% of functional chains in the middle of the chain, 16% of non-functional chains and 14% of non-functional star-branched chains.

Preparation of the Polymer K: BR Mercaptoalkoxysilane-Functional in the Middle of the Chain—Comparative Tg −91° C.

7.5 kg of butadiene and also 313 ml of a 0.349 mol·l$^{-1}$ solution of tetrahydrofuran in methylcyclohexane, are injected into a 90-litre reactor, maintained under a nitrogen pressure of approximately 2 bar, containing 43.9 kg of methylcyclohexane. After neutralization of the impurities in the solution to be polymerized by addition of n-butyllithium, 1019 ml of 0.063 mol·l$^{-1}$ n-butyllithium in methylcyclohexane are added. The polymerization is carried out at 50° C.

After 95 minutes, the degree of conversion of the monomers reaches 88%. This content is determined by weighing an extract dried at 140° C. under a reduced pressure of 200 mmHg. 516 ml of a 0.015 mol·l$^{-1}$ solution of MeSiCl$_3$ in methylcyclohexane are added to the solution of living polymer. After reacting at 50° C. for 15 minutes, 590 ml of a 0.035 mol·l$^{-1}$ solution of 3,3-methoxy-8,8,9,9-tetramethyl-2-oxa-7-thia-3,8-disiladecane in methylcyclohexane are subsequently added to this polymer solution. After reacting at 50° C. for 30 minutes, the solution is antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on an open mill at 100° C.

The microstructure of this copolymer is determined by the NIR method: the content by weight of 1,4-trans units is 49%, that of 1,4-cis units is 36% and that of 1,2-units is 15%.

The glass transition temperature of this copolymer is −90° C.

The Mooney viscosity of the polymer K is 61.

The distribution of the entities after functionalization is given by the high-resolution SEC method: 51% of functional chains in the middle of the chain, 15% of non-functional chains and 34% of star-branched chains.

Rubber Compositions:

The elastomers A to K were used to prepare rubber compositions of tread type, each comprising silica as reinforcing filler.

Each of the following compositions is produced, in a first step, by thermomechanical working and then, in a second finishing step, by mechanical working.

The elastomer, two thirds of the silica, the black, the coupling agent and the oil, and then, approximately one minute later, the remainder of the reinforcing filler, the resin, the antioxidant, the stearic acid and the antiozone wax and then, approximately two minutes later, the zinc oxide, are introduced successively into a laboratory internal mixer of Banbury type, with a 400 cm$^3$ capacity, filled to 70%, the initial temperature of which is 90° C.

The step of thermomechanical working is carried out for 4 to 5 minutes, up to a maximum dropping temperature of approximately 160° C.

The abovementioned first step of thermomechanical working is thus carried out, it being specified that the mean speed of the blades during this first step is 50 rpm.

The mixture thus obtained is recovered and cooled and then, in an external mixer (homofinisher), the sulfur and the accelerator are added at 30° C., the combined mixture being further mixed for a time of 3 to 4 minutes (abovementioned second step of mechanical working).

The compositions thus obtained are subsequently calendered, either in the form of slabs (with a thickness ranging from 2 to 3 mm) or thin sheets of rubber, for the measurement of their physical or mechanical properties, or in the form of profiled elements which can be used directly, after cutting and/or assembling to the desired dimensions, for example as semi-finished products for tires, in particular for treads.

Crosslinking is carried out at 150° C. for 40 min.

Each of the compositions has the following formulation (expressed in phr: parts per hundred parts of elastomer):

| Ingredients | Compositions | | | | | | | |
|---|---|---|---|---|---|---|---|---|
| | A in accordance | B in accordance | C not in accordance | D not in accordance | E in accordance | F in accordance | G in accordance | H not in accordance |
| Polymer A | 100 | | | | | | | |
| Polymer B | | 100 | | | | | | |
| Polymer C | | | 100 | | | | | |
| Polymer D | | | | 100 | | | | |
| Polymer E | | | | | 100 | | | |
| Polymer F | | | | | | 100 | | |
| Polymer G | | | | | | | 100 | |
| Polymer H | | | | | | | | 100 |
| Silica | 120 | 120 | 120 | 120 | 120 | 120 | 120 | 120 |
| Carbon black | 4 | 4 | 4 | 4 | 4 | 4 | 4 | 4 |
| Oil | 12 | 12 | 12 | 12 | 12 | 12 | 12 | 12 |
| Resin | 73 | 73 | 73 | 73 | 73 | 73 | 73 | 73 |
| Coupling agent | 9.6 | 9.6 | 9.6 | 9.6 | 9.6 | 9.6 | 9.6 | 9.6 |
| Stearic acid | 3 | 3 | 3 | 3 | 3 | 3 | 3 | 3 |
| Zinc oxide | 1.5 | 1.5 | 1.5 | 1.5 | 1.5 | 1.5 | 1.5 | 1.5 |
| Soluble sulfur | 1.5 | 1.5 | 1.5 | 1.5 | 1.5 | 1.5 | 1.5 | 1.5 |
| Accelerator | 1.5 | 1.5 | 1.5 | 1.5 | 1.5 | 1.5 | 1.5 | 1.5 |
| Antioxidant | 3 | 3 | 3 | 3 | 3 | 3 | 3 | 3 |

| Ingredients | Compositions | | |
|---|---|---|---|
| | I in accordance | J not in accordance | K not in accordance |
| Polymer I | 100 | | |
| Polymer J | | 100 | |
| Polymer K | | | 100 |
| Silica | 120 | 120 | 120 |
| Carbon black | 4 | 4 | 4 |
| Oil | 12 | 12 | 12 |
| Resin | 73 | 73 | 73 |
| Coupling agent | 9.6 | 9.6 | 9.6 |
| Stearic acid | 3 | 3 | 3 |
| Zinc oxide | 1.5 | 1.5 | 1.5 |
| Soluble sulfur | 1.5 | 1.5 | 1.5 |
| Accelerator | 1.5 | 1.5 | 1.5 |
| Antioxidant | 3 | 3 | 3 |

Silica: Z1165 MP from Solvay, BET surface area of approximately 160 m$^2$/g
Carbon black: ASTM grade N234 from Cabot Corporation
Oil: Lubrirob Tod 1880 from Novance
Resin: ECR-373 from ExxonMobil
Coupling agent: TESPT Si69 from Degussa
Accelerator: Santocure CBS from Flexsys
Antioxidant: 6-paraphenylenediamine (6PPD) from Flexsys Results:

The results given in tables 1 to 3 below show that the use of the polymer according to the invention enables a significant improvement in wear, and an improvement in the rolling resistance, achieving a good level of resistance to flow of the polymer.

TABLE 1

| | Compositions | | | | |
|---|---|---|---|---|---|
| | A | B | C not in accordance | D not in accordance | E |
| Cold Flow | 57 | 66 | 100 | 22 | 30 |
| Hysteresis tan δmax 23° C. | 75 | 71 | 100 | 78 | 75 |
| Loss by abrasion | 65 | 64 | 100 | 65 | 65 |

Standardized in base 100 relative to sample C

TABLE 2

| | Compositions | | |
|---|---|---|---|
| | F | G | H not in accordance |
| Cold Flow | 95 | 97 | 100 |
| Hysteresis tan δmax 23° C. | 75 | 71 | 100 |
| Loss by abrasion | 65 | 64 | 100 |

Standardized in base 100 relative to sample H

TABLE 3

| | Compositions | | |
|---|---|---|---|
| | I | J not in accordance | K not in accordance |
| Cold Flow | 100 | 100 | 37 |
| Hysteresis tan δmax 23° C. | 75 | 100 | 78 |
| Loss by abrasion | 64 | 100 | 64 |

Standardized in base 100 relative to sample

The invention claimed is:

1. A modified diene elastomer comprising:
   a) at least 70% by weight, relative to the total weight of the modified diene elastomer, of a linear diene elastomer functionalized predominantly in the middle of the chain by an alkoxysilane group, optionally partially or completely hydrolysed to give silanol, the alkoxysilane group optionally bearing another function capable of interacting with a reinforcing filler, the silicon atom of the alkoxysilane group being located in the main chain of the diene elastomer;
   b) more than 0 and up to 30% by weight, relative to the total weight of the modified diene elastomer, of a star-branched diene elastomer,
   the Mooney viscosity of said modified diene elastomer ranging from 50 to 80, and its glass transition temperature (Tg) ranging from −100° C. to −80° C.

2. An elastomer according to claim 1, comprising:
   a) at least 75% by weight, relative to the total weight of the modified diene elastomer, of the linear diene elastomer functionalized predominantly in the middle of the chain by an alkoxysilane group,
   b) at most 25% by weight, relative to the total weight of the modified diene elastomer, of the star-branched diene elastomer.

3. An elastomer according to claim 1 wherein the elastomer a), the linear diene elastomer functionalized predominantly in the middle of the chain by an alkoxysilane group, consists of at least 80% by weight, relative to the total weight of the elastomer a), of linear chains functionalized in the middle of the chain.

4. An elastomer according to claim 1, wherein the star-branched diene elastomer b) is a tin-based or silicon-based star-branched elastomer.

5. An elastomer according to claim 4, wherein the star-branched diene elastomer b) is a three-branched star-branched elastomer branched by a silicon atom bearing, or not bearing, a function capable of interacting with a reinforcing filler, the silicon atom being substituted by the three branches of the star-branched diene elastomer.

6. An elastomer according to claim 1 wherein the function capable of interacting with a reinforcing filler is a function chosen from cyclic or non-cyclic, primary, secondary or tertiary amines, isocyanates, imines, cyanos, thiols, carboxylates, epoxides or primary, secondary or tertiary phosphines.

7. An elastomer according to claim 6, wherein the function capable of interacting with a reinforcing filler is a cyclic or non-cyclic primary, secondary or tertiary amine function.

8. An elastomer according to claim 7, wherein the function capable of interacting with a reinforcing filler is a tertiary amine function.

9. An elastomer according to claim 1, wherein the function capable of interacting with a reinforcing filler and the silicon atom bonded to the linear diene elastomer are connected to one another via a spacer group defined as being a saturated or unsaturated, cyclic or non-cyclic, linear or branched, divalent $C_1$-$C_{18}$ aliphatic hydrocarbon-based radical or a divalent $C_6$-$C_{18}$ aromatic hydrocarbon-based radical, said spacer group optionally comprising one or more aromatic radicals and/or one or more heteroatoms.

10. An elastomer according to claim 9, wherein the spacer group is a linear divalent $C_1$-$C_{18}$ aliphatic hydrocarbon-based radical.

11. An elastomer according to claim 9, wherein at least one, at least two, at least three, at least four or at least five or all of the following characteristics is (are) complied with:
   the star-branched diene elastomer b) is a three-branched star-branched elastomer branched by a silicon atom bearing another function capable of interacting with a reinforcing filler, the silicon atom being substituted by the three branches of the diene elastomer,
   the function capable of interacting with a reinforcing filler is a tertiary amine,
   the spacer group is a linear $C_1$-$C_{18}$ hydrocarbon-based radical,
   the alkoxysilane group is a methoxysilane or ethoxysilane, optionally partially or completely hydrolysed to give silanol,
   the modified diene elastomer is a butadiene polymer,
   the modified diene elastomer comprises at least 75% by weight of the linear diene elastomer functionalized predominantly in the middle of the chain a) and at most 25% by weight of the star-branched diene elastomer b), relative to the total weight of the modified diene elastomer.

12. An elastomer according to claim 11, wherein
   the star-branched diene elastomer b) is a three-branched star-branched elastomer branched by a silicon atom bearing a diethylamino- or dimethylamino-group,
   the function capable of interacting with a reinforcing filler is a tertiary amine,
   the spacer group is a linear $C_3$ hydrocarbon-based radical,
   the alkoxysilane group is a methoxysilane or ethoxysilane, optionally partially or completely hydrolysed to give silanol,
   the modified diene elastomer is a butadiene homopolymer or a butadiene/styrene copolymer,
   the modified diene elastomer comprises at least 75% by weight of the linear diene elastomer functionalized predominantly in the middle of the chain a) and at most 25% by weight of the star-branched diene elastomer b), relative to the total weight of the modified diene elastomer.

13. An elastomer according to claim 1, wherein the alkoxysilane group of the linear diene elastomer a) is a methoxysilane or ethoxysilane group, optionally partially or completely hydrolysed to give silanol.

14. An elastomer according to claim 1, wherein the modified diene elastomer comprises at most 20% by weight, relative to the total weight of the modified diene elastomer, of the star-branched diene elastomer b).

15. An elastomer according to claim 1, wherein the modified diene elastomer is a butadiene homopolymer having a molar ratio of cis-1,4 bonds/trans-1,4 bonds ranging from 1 to 0.65 and a content of vinyl units relative to the diene portion ranging from 8 to 15% by weight.

16. An elastomer according to claim 1, wherein the modified diene elastomer is a copolymer of butadiene and of a vinylaromatic monomer having a content of vinylaromatic units of between 0 and 5% by weight relative to the total weight of the diene elastomer, and also a content of vinyl units relative to the diene portion ranging from 8 to 15% by weight.

17. An elastomer according to claim 1, wherein the linear diene elastomer a) and the star-branched diene elastomer b) have, before functionalization and star-branching, the same microstructure and the same macrostructure.

18. An elastomer according to claim 1, wherein the modified diene elastomer is obtained by a process which comprises the following steps:
   anionic polymerization of at least one conjugated diene monomer in the presence of a polymerization initiator in order to form a living diene elastomer;

modification of the elastomer by reaction with a functionalization agent with a molar ratio of the functionalization agent to the polymerization initiator ranging from 0.40 to 0.75, the functionalization agent corresponding to the following formula 1:

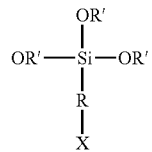

Formula 1 in which:
R is a saturated or unsaturated, cyclic or non-cyclic, divalent $C_1$-$C_{18}$ aliphatic hydrocarbon-based radical or $C_6$-$C_{18}$ aromatic hydrocarbon-based radical,
X is a hydrogen atom or a function capable of interacting with a reinforcing filler,
the R' radicals, which are substituted or unsubstituted and identical or different, represent a $C_1$-$C_{10}$.

19. A rubber composition based on at least one reinforcing filler and on an elastomer matrix comprising at least one modified diene elastomer as defined in claim 1.

20. A semi-finished article made of rubber for a tire, wherein the tire comprises a crosslinkable or crosslinked rubber composition according to claim 19.

21. A tire comprising a semi-finished article as defined in claim 20.

* * * * *